(12) United States Patent
Ogawa et al.

(10) Patent No.: US 7,664,375 B2
(45) Date of Patent: Feb. 16, 2010

(54) INFORMATION SIGNAL EDITION APPARATUS, INFORMATION SIGNAL EDITION METHOD, AND INFORMATION EDITION PROGRAM

(75) Inventors: Nobuyuki Ogawa, Takatsuki (JP); Shunji Kagamibashi, Neyagawa (JP); Atsuo Tsuji, Nara (JP); Kiyoshi Tominaga, Osaka (JP); Wataru Masuda, Hirakata (JP); Yoshimitsu Nakamura, Ikoma (JP); Haruhiko Tada, Neyagawa (JP); Hideto Kobayashi, Katano (JP)

(73) Assignee: Panasonic Corporation, Osaka (JP)

( * ) Notice: Subject to any disclaimer, the term of this patent is extended or adjusted under 35 U.S.C. 154(b) by 1309 days.

(21) Appl. No.: 10/343,065

(22) PCT Filed: May 27, 2002

(86) PCT No.: PCT/JP02/05108

§ 371 (c)(1),
(2), (4) Date: Jan. 24, 2003

(87) PCT Pub. No.: WO02/097817

PCT Pub. Date: Dec. 5, 2002

(65) Prior Publication Data

US 2003/0165320 A1 Sep. 4, 2003

(30) Foreign Application Priority Data

May 25, 2001 (JP) ............................. 2001-156551
May 28, 2001 (JP) ............................. 2001-158740
Jun. 14, 2001 (JP) ............................. 2001-179716

(51) Int. Cl.

| H04N 5/76 | (2006.01) |
| H04N 7/00 | (2006.01) |
| H04N 5/00 | (2006.01) |

(52) U.S. Cl. ........................................ 386/125; 386/46
(58) Field of Classification Search .................... 386/1, 386/45–46, 125–126
See application file for complete search history.

(56) References Cited

U.S. PATENT DOCUMENTS 5,825,739 A  10/1998  Saito et al.

(Continued)

FOREIGN PATENT DOCUMENTS

EP   0 840 528   5/1998

(Continued)

OTHER PUBLICATIONS

Switching Facilities in MPEG-2: Necessary but not Sufficient, SMPTE Journal, SMPTE Inc., Vo. 104, No. 12, Dec. 1, 1995, pp. 788-802, p. 801, middle column.

*Primary Examiner*—Thai Tran
*Assistant Examiner*—Nigar Chowdhury
(74) *Attorney, Agent, or Firm*—Marjama Muldoon Blasiak & Sullivan, LLP

(57) ABSTRACT

In an information signal editing device, when a user specifies a desired reproduction section or reproduction start position, a management information file recorded in a memory is rewritten into a second management information file which is created on the basis of the specified information, and a second information file is set on the basis of the second management information file. The information signal editing device constructed as described performs arbitrary virtual editing when a DVD-RAM disk is non-rewritable, whereby the user can obtain a desired reproduction signal.

2 Claims, 15 Drawing Sheets

U.S. PATENT DOCUMENTS

| | | |
|---|---|---|
| 6,314,192 B1 | 11/2001 | Chen et al. |
| 6,721,495 B1 * | 4/2004 | Kawai et al. ................ 386/126 |
| 2001/0012436 A1 * | 8/2001 | Nakaya ....................... 386/52 |

FOREIGN PATENT DOCUMENTS

| | | |
|---|---|---|
| JP | 06-231572 | 8/1994 |
| JP | 7-85637 | 3/1995 |
| JP | 07192436 | 7/1995 |
| JP | 08036865 | 2/1996 |
| JP | 08106765 | 4/1996 |
| JP | 09-037204 | 2/1997 |
| JP | 9-147531 | 6/1997 |
| JP | 10-136308 | 5/1998 |
| JP | 10174065 | 6/1998 |
| JP | 10-293989 | 11/1998 |
| JP | 11-69301 | 3/1999 |
| JP | 2000-078531 | 3/2000 |
| JP | 2000-90643 | 3/2000 |
| JP | 2000-156071 | 6/2000 |
| JP | 2000-165862 | 6/2000 |
| JP | 2000165862 | 6/2000 |
| JP | 2001-057055 | 2/2001 |
| JP | 2001-101839 | 4/2001 |
| JP | 2001-126453 | 5/2001 |
| JP | 2002-010203 | 1/2002 |

* cited by examiner

INFORMATION SIGNAL EDITION APPARATUS, INFORMATION SIGNAL EDITION METHOD, AND INFORMATION EDITION PROGRAM

CROSS REFERENCE TO RELATED APPLICATIONS

This application is a 35 USC § 371 filing and claims priority from JP2001-156551 filed 25 May 2001, JP2001-158740 filed 28 May 2001, JP2001-179716 filed 14 Jun. 2001, and PCT/JP02/05108 filed 27 May 2002, the entirety of which are incorporated herein by reference.

FIELD OF THE INVENTION

The present invention relates to a device, a method and a program for editing an information signal recorded on a recording medium such as an optical disk.

BACKGROUND OF THE INVENTION

In recent years, signals of consumer reproduction video data tend to be subjected to digitalization, and the digitalized signals are recorded in various types of media. There is a DVD format that is standardized and is prevalent worldwide as a common format. This DVD standard includes a "DVD video recording standard", as a standard for recording, that enables to record and reproduce video/audio data on/from rewritable media. While a detailed description thereof, which is given in the written standards, is omitted, the outline of the construction thereof will be given with reference to FIG. 16.

FIG. 16 is a diagram illustrating the construction of a conventional digital video recording/reproduction device.

In FIG. 16, numeral 1 denotes a DVD-RAM disk as a rewritable medium, numeral 2 denotes an MPEG stream recorded on the DVD-RAM disk 1, and numeral 3 denotes a first management information file for collectively managing constituent elements of the MPEG stream 2 and MPEG information (including resolution information for the MPEG stream 2, MPEG stream information indicating the size of each GOP or the like, information of a reproduction start position, information specifying a reproduction section and the like).

Numeral 4 denotes a reading means for accurately detecting and reading an information signal (actual file data) from the DVD-RAM 1 via an optical pickup or the like. Numeral 5 denotes an MPEG decoder which receives the MPEG stream 2 outputted from the reading means 4, decompresses data from the MPEG stream 2, and demodulates and reproduces video data and audio data. Numeral 6 denotes a reading control means for controlling the reading means 4 on the basis of the result obtained by a management information analysis means 7, that is, control information indicating a specified range or the like. Numeral 7 denotes the management information analysis means which obtains part or all of the first management information file 3 for video recording, which is recorded on the DVD-RAM disk 1, from the signal outputted from the reading means 4, and analyzes the obtained data. Numeral 8 denotes a video signal output terminal for outputting reproduced video data. Numeral 9 denotes an audio signal output terminal for outputting reproduced audio data.

In the case of a rewritable information medium such as the DVD-RAM disk 1, there are generally provided recording functions as described below.

Numeral 20 denotes a rewriting means for rewriting the DVD-RAM disk 1 by writing or erasing information relating to the first management information file 3 in/from the disk 1. Numeral 22 denotes a video signal input terminal for receiving a video signal. Numeral 23 denotes an audio signal input terminal for receiving an audio signal. Numeral 21 denotes an MPEG encoder which compresses the video signal inputted from the video signal input terminal 22 and the audio signal inputted from the audio signal input terminal 23, to create an MPEG stream based on the video recording standard. Further, numeral 26 denotes a reproduction section specifying means, through which a user specifies a desired reproduction section. Numeral 27 denotes a reproduction start position specifying means, through which a user specifies a desired reproduction start position. Numeral 25 denotes a management information rewriting specifying means for specifying information of an item of the first information management file 3 recorded on the DVD-RAM disk 1, that is to be rewritten, or an item to be added, on the basis of the information specified by the reproduction section specifying means 26 or the reproduction start position specifying means 27. Numeral 24 denotes a rewriting control means for controlling the rewriting means 20 so that it rewrites data recorded on the DVD-RAM disk 1 when the data are rewritten into the information specified by the management information rewriting specifying means 25, the information is newly recorded in the MPEG stream 2, or the information is erased from the MPEG stream 2.

An operation of the information signal editing device constructed as described above will be described.

An information signal based on the video recording standard is recorded on the DVD-RAM disk 1. The information signal includes stream data which is constituted by digitalized video signal and audio signal, and the first management information file 3 for managing the stream data. The specification of the stream data is prescribed according to the standard thereof, and the stream data is compressed and decoded on the basis of, for example, an MPEG2. The audio signal is an MPEG audio or a compressed audio based on an AC-3 or the like, and this signal is recorded as a system stream by a dedicated constitution method. (Hereinafter, a description will be given taking the MPEG stream 2 as an example.) The first management information file 3 is recorded on the DVD-RAM disk 1 on which the MPEG stream 2 is recorded, as a single file, with an extension ".ifo", and is located in a folder in which the MPEG stream 2 is located.

As described above, the first management information file 3 includes the information relating to the constitution of the recorded MPEG stream 2 (such as the information of the size of a GOP as a compression unit, information of an entire volume, information of an amount of a piece of recorded data, the resolution information for the video signal). Further, in the video recording standard, a function of reproducing data on the basis of the result of simple editing of the management information is supported, and the result of the simple editing is also recorded in the management information file.

The simple editing function here is to add information of a specified part to the management information by user's specification of the desired reproduction section, reproduction start position or the like, from the information signal constituted by the MPEG stream and the management information, which is recorded on the DVD-RAM disk or the like. Since there is no need to modify the MPEG stream itself, the operation of the simple editing can be completed in a short time. Therefore, since random accessing, which is a characteristic of a plate-shaped recording medium such as the DVD-RAM 1, is performed quickly, the data which is subjected to the simple editing as described above can be reproduced smoothly regardless of the fact that data on the DVD-RAM disk 1 such as the MPEG stream 2 is not modified.

FIG. 16 illustrates the case of reproduction start position information to show a typical example of the simple editing function. The reproduction start position information is information of a scene specified by a user. The reproduction start position information is usually constituted by reproduction position information of the MPEG stream and, in addition, there are cases where the reproduction start position information is related to a physical or logical position on the DVD-RAM disk 1 to make it possible to smoothly specify a reproduction position, or is constituted by time axis information of video/audio stream data or quantity information of constituent elements.

The information signal recorded on the basis of the video recording standard as described above is outputted from the reading means 4 in the form processable by the MPEG decoder 5 or the like. Generally, the reading means 4 has a DVD-RAM reproduction means or a means for controlling an information medium reproduction means of a personal computer or the like which is incorporated with the DVD-RAM reproduction means, and has a controlling function to accurately read data by a dedicated application, microcomputer or the like, and a processing function such as a file system, whereby the information signal is outputted as reproduction data.

In the signal outputted from the reading means 4, information read by the MPEG decoder 5 is decompressed or the like, whereby data are decomposed. Then, video data is decompressed into original non-compressed video data from the MPEG stream 2, and audio data, when it is compressed, is decompressed into an original non-compressed audio. The respective data are outputted to the outside from the video output terminal 8 and the audio output terminal 9, converted into analog data or the like, and outputted to a monitor and a speaker, whereby a user is able to enjoy the content recorded on the DVD-RAM disk 1.

Further, among the digital signal outputted from the reading means 4, part of data of the first management information file 3 recorded on the DVD-RAM disk 1 is inputted to the management information analysis means 7. The management information analysis means 7 obtains desired management information from the information signal constituted by the MPEG stream 2 and the first management information file 3, which is recorded on the basis of the video recording standard, through the reading means 4. Then, the management information analysis means 7 analyzes information relating to reproduction, among the obtained management information. To be specific, the management information analysis means 7 analyzes information for performing continuous reproduction, information relating to a reproduction start position, and/or information specifying a reproduction section, and sends a required result to the reading control means 6, and the reading means 4 is controlled according to the specified reproduction mode. In this case, while not shown in the drawing, the device may be provided with an interface connecting the same with a user, so as to analyze the reproduction information selected by the user.

For example, the information analysis means 7 searches the selected reproduction start position from a plurality of reproduction start positions, through the first management information file 3 recorded on the DVD-RAM disk 1, and sends the information relating to the actual reproduction start position of the MPEG stream 2 that is recorded on the DVD-RAM disk 1, to the reading control means 6 on the basis of the searched information. The reading means 4 reads data according to the control by the reading control means 6, whereby reproduction at a desired position which is selected by a user becomes possible, so that the user can enjoy a desired reproduction video and audio.

Further, the conventional system as described above has a function of recording data on the DVD-RAM disk 1. In FIG. 16, a video signal and an audio signal inputted to the video input terminal 22 and the audio input terminal 23 are outputted from the MPEG encoder 21 as an MPEG stream. In this case, the video signal and the audio signal are subjected to MPEG compression and system-encoding. The format for the MPEG compression and the system-encoding is standardized in a like manner as that of the MPEG stream 2 and the first management information file 3 recorded on the DVD-RAM disk 1. The information signal outputted from the MPEG encoder 21 is, through the rewriting means 20, recorded on the DVD-RAM disk 1. Concurrently, the constituent content of the MPEG stream 2 is added to the first management information file 3 and, thus, the first management information file recorded on the DVD-RAM disk 1 is rewritten, and a second MPEG stream which is selected from the MPEG stream 2 recorded on the DVD-RAM disk 1 is reproduced on the basis of the rewritten management information file. At this time, even when there is additional data recording, the newly created MPEG file is a single file, and this file is added to the previous MPEG stream 2, and information relating to this added MPEG file is newly registered with the first management information file 3, whereby reproduction can be performed smoothly.

Further, when the simple editing supported by the video recording standard is performed by a user, the first management information file 3 recorded on the DVD-RAM disk 1 is rewritten. That is, for example, when the user specifies a specific section through the reproduction section specifying means 26, the first management information file 3 is rewritten by the rewriting control means 24 and the rewriting means 20, through the management information rewriting specifying means 25, on the basis of the specified range. Similarly, the first management information file recorded on the DVD-RAM disk 1 is rewritten by adding or deleting data to/from the first management information file 3, or modifying the same, on the basis of the information relating to the reproduction start position specified through the reproduction start position specifying means 27. Then, the second MPEG stream which is selected from the MPEG stream 2 recorded on the DVD-RAM disk 1 is reproduced on the basis of the rewritten management information file.

In this way, the first management information file 3 on the DVD-RAM disk 1 is rewritten by the simple editing function. When reproduction is performed, data are read on the basis of the newly rewritten management information file on the DVD-RAM disk 1. For example, when the reproduction start position is specified first, a user can specify the reproduction start position as well as specifying for general reproduction, and thus there is no need to search data requiring long reproduction time or the like, for the reproduction start position, resulting in instant data reproduction at the desired reproduction start position.

In this case, it is usual that the management information file 3 is rewritten when the simple editing or the like is finished, and the updated management information file is applied when reproduction is performed. Specifically, in order to protect the rewriting into the updated management information file from occurrence of power failure, an operation of ejecting a commutative disk such as the DVD-RAM disk 1 or the like, the rewriting of the DVD-RAM disk 1 is instantly carried out with the operation of specifying rewriting of the first management information file 3.

As described above, when the simple editing is performed, the rewriting of the management information file recorded on the DVD-RAM disk 1 has been required.

However, the above-described construction has a problem that it is impossible to carry out the simple editing when the information signal cannot be rewritten. To be specific, when the so-called write-protect such as a process of prohibiting writing on the DVD-RAM disk 1 is applied to protect the information signal written on the DVD-RAM disk 1, the first management information file 3 on the DVD-RAM disk 1 cannot be rewritten. Accordingly, it is impossible to carry out the simple editing as described above making full use of the characteristic of the disk, in which a reproduction start position at user's request is specified so that reproduction is performed from the specified position without rewriting the MPEG stream 2.

Further, in the above-described construction, while the information signal can be reproduced, it may be impossible to create an arbitrary duplicate file that is selected by a user from the information signal recorded on the DVD-RAM disk 1.

Furthermore, when a duplicate of the MPEG stream is created, there is no means for managing the duplicate stream. Therefore, a long time is required for an operation of reproducing the created duplicate stream.

The present invention is made to solve the above-described problem and has for its object to provide a device, a method, and a program for easily editing an information signal regardless of a state of a disk or the like, i.e., whether rewriting of the information signal recorded on the disk is possible or not.

SUMMARY OF THE INVENTION

According to Claim 1 of the present invention, there is provided an information signal editing device for editing an information signal that includes a first information file constituted by plural signals with different size of capacities, which signals are independent and relevant from/to each other; and a first management information file for managing the first information file, comprising: a recording means for recording either the first information file or the first management information file into a memory; and a management information file storage means for storing a second management information file for managing either the first information file included in the information signal or the first information file recorded in the memory by the recording means, into the memory according to a prescribed instruction.

Therefore, a user can easily edit a desired information signal.

According to Claim 2 or the present invention, in the information signal editing device as defined in Claim 1, the instruction specifies part of a signal having a maximum data size, from the first information file, the recording means records the information file including part of the maximum-data-size signal that is specified according to the instruction, into the memory as a second information file, and the management information file storage means stores a management information file for managing the second information file into the memory as the second management information file.

Therefore, the first information file on the basis of the first management information file which is previously specified by a user is stored in the memory, and the second management information having the management information relating to the second information file stored in the memory is also stored in the memory, whereby the second information file at user's request can be freely specified on the basis of the second management file, resulting in editing at user's request.

According to Claim 3 of the present invention, in the information signal editing device as defined in Claim 2, the instruction specifies part of the maximum-data-size signal on the basis of information which is obtained by reproducing the first information file.

Therefore, with respect to the first information file managed by the first management information, for which reproduction information is not inputted, a reproduction section or a reproduction range of the first information file, which meets user's request, is freely specified and stored in the memory as the second information file, and the second information file can be freely specified by a user on the basis of the second management information file which is stored in the memory with the second information file, resulting in editing at user's request.

According to Claim 4 of the present invention, in the information signal editing device as defined in Claim 1, the recording means records only the fist management information file into the memory, the management information file storage means rewrites the first management information file stored in the memory into the second management information file according to the instruction, and the editing device further includes: a setting means for setting the first information file as a second information file on the basis of the second management information file.

Therefore, in a state where an information signal cannot be rewritten, it is possible to set the second information file in which an arbitrary reproduction start position or reproduction section is specified, from the first management information file, or to output and reproduce the second information file.

According to Claim 5 of the present invention, the information signal editing device as defined in Claim 4 further including: an output means for outputting the second information file.

Therefore, it is possible to easily realize a device that creates plural files in which ranges are specified by utilizing simple editing or the result of the simple editing, without significantly changing the system construction.

According to Claim 6 of the present invention, in the information signal editing device as defined Claim 1, the information file recorded in the memory is stream data constituted by audio data and video data, and the editing device includes: a separation means for separating the audio data and the video data from the stream data; a time information obtaining means for obtaining time information from the output data from the separation means; an audio decoding means for decoding the audio data separated by the separation means; a time matching means for performing time matching by adding or deleting part of data to/from the output data from the audio decoding means; an audio encoding means for compressing the output data from the time matching means in a prescribed format; and a multiplexing means for multiplexing the video data separated by the separation means and the output from the audio encoding means.

Therefore, it is possible to easily create a file with no audio deviation without deteriorating a picture quality of video data.

According to Claim 7 of the present invention, there is provided an information signal editing device for editing stream data constituted by video data and audio data, comprising: a separation means for separating the audio data and the video data from the stream data; a time information obtaining means for obtaining time information from the output data from the separation means; an audio decoding means for decoding the audio data separated by the separation means; a time matching means for performing time matching by adding or deleting part of data to/from the output data from the audio decoding means; an audio encoding means for compressing the output data from the time matching means in a prescribed format; and a multiplexing means for multiplexing the video data separated by the separation means and the output from the audio encoding means.

Therefore, it is possible to easily create a file with no audio deviation without deteriorating a picture quality of video data.

According to Claim 8 of the present invention, there is provided an information signal editing method comprising: recording either a first information file constituted by plural signals with different size of capacities, which signals are independent and relevant from/to each other, or a first management information file for managing the first information file, into a memory; and storing a second management information file for managing either the first information file or the first information file recorded in the memory, into the memory according to a prescribed instruction.

Therefore, a user can easily edit a desired information signal.

According to Claim 9 of the present invention, in the information signal editing method as defined in Claim 8, part of a signal having a maximum data size is specified from the first information file recorded in the memory, the information file including specified part of the maximum-data-size signal is recorded in the memory as a second information file, and a management information file for managing the second information file is stored in the memory as the second management information file.

Therefore, the first information file on the basis of the first management information file which is previously specified by a user is stored in the memory, and the second management information having the management information relating to the second information file stored in the memory is also stored in the memory, whereby the second information file at user's request can be freely specified on the basis of the second management file, resulting in editing at user's request.

According to Claim 10 of the present invention, in the information signal editing method as defined in Claim 9, with respect to the information file recorded in the memory, part of a signal having a maximum data size is specified on the basis of information obtained by reproducing the first information file.

Therefore, with respect to the first information file managed by the first management information, for which reproduction information is not inputted, a reproduction section or a reproduction range of the first information file, which meets user's request, is freely specified and stored in the memory as the second information file, and the second information file can be freely specified by a user on the basis of the second management information file which is stored in the memory with the second information file, resulting in editing at user's request.

According to Claim 11 of the present invention, the information signal editing method as defined in Claim 8, comprising: recording only the first management information file in the memory; rewriting the first management information file stored in the memory into the second management information file according to the instruction; and setting the first information file as a second information file on the basis of the second management information file.

Therefore, in a state where an information signal cannot be rewritten, it is possible to set the second information file in which an arbitrary reproduction start position or reproduction section is specified, from the first management information file, or to output and reproduce the second information file.

According to claim 12 of the present invention, the information signal editing method as defined in Claim 11 comprises: outputting the second information file as a duplicate file.

Therefore, it is possible to easily realize a device that creates plural files in which ranges are specified by utilizing simple editing or the result of the simple editing, without significantly changing the system construction.

According to Claim 13 of the present invention, in the information signal editing method as defined in any of Claims 8 to 12, the information file recorded in the memory is stream data constituted by video data and audio data, and the editing method comprises: separating the audio data and the video data from the stream data, and obtaining time information from the separated audio data and video data; decoding the separated audio data, performing time matching on the basis of the time information, and encoding the time-matched audio data; and multiplexing the separated video data and the encoded audio data.

Therefore, it is possible to easily create a file with no audio deviation without deteriorating a picture quality of video data.

According to Claim 14 of the present invention, there is provided an information signal editing method comprising: separating audio data and video data from stream data constituted by the video data and the audio data, and obtaining time information from the separated audio data and video data; decoding the separated audio data, performing time matching on the basis of the time information, and encoding the time-matched audio data; and multiplexing the separated video data and the encoded audio data.

Therefore, it is possible to easily create a file with no audio deviation without deteriorating a picture quality of video data.

According to Claim 15 of the present invention, there is provided an information signal editing program for making a computer perform an information signal editing process of editing an information signal that includes a first information file constituted by plural signals with different size of capacities, which signals are independent and relevant from/to each other; and a first management information for managing the first information file, comprising: a first program for making the computer perform a recording process of recording either the first information file or the first management information file in a memory; and a second program for making the computer perform a management information file storage process of storing a second management information file for managing either the first information file or the first information file recorded in the memory, in the memory according to a proscribed editing process.

Therefore, a user can easily edit a desired information signal.

According to Claim 16 of the present invention, there is provided an information signal editing program for making a computer perform an information signal editing process of editing stream data constituted by video data and audio data, comprising: a first program for making the computer perform a separation process of separating the audio data and the video data from the stream data; a second program for making the computer perform a time information obtaining process of obtaining time information from the separated audio data and video data; a third program for making the computer perform an audio data process for decoding the separated audio data, performing time matching on the basis of the time information, and encoding the time-matched audio data; and a fourth program for making the computer perform a multiplexing process of multiplexing the separated video data and the encoded audio data.

Therefore, it is possible to easily create a file with no audio deviation without deteriorating a picture quality of video data.

BRIEF DESCRIPTION OF THE DRAWINGS

FIGS. 14 are diagrams illustrating an output signal from the information signal editing device which is provided with the multiplexing processing means.

FIGS. 15 are diagrams illustrating an output signal from the information signal editing device.

DETAILED DESCRIPTION OF THE PREFERRED EMBODIMENT

Hereinafter, embodiments of the present invention will be described with reference to the drawings. The embodiments described here are given only as examples and the present invention is not restricted to these embodiments.

Embodiment 1

Hereinafter, an information signal editing device according to a first embodiment of the present invention will be described.

Figure 1:
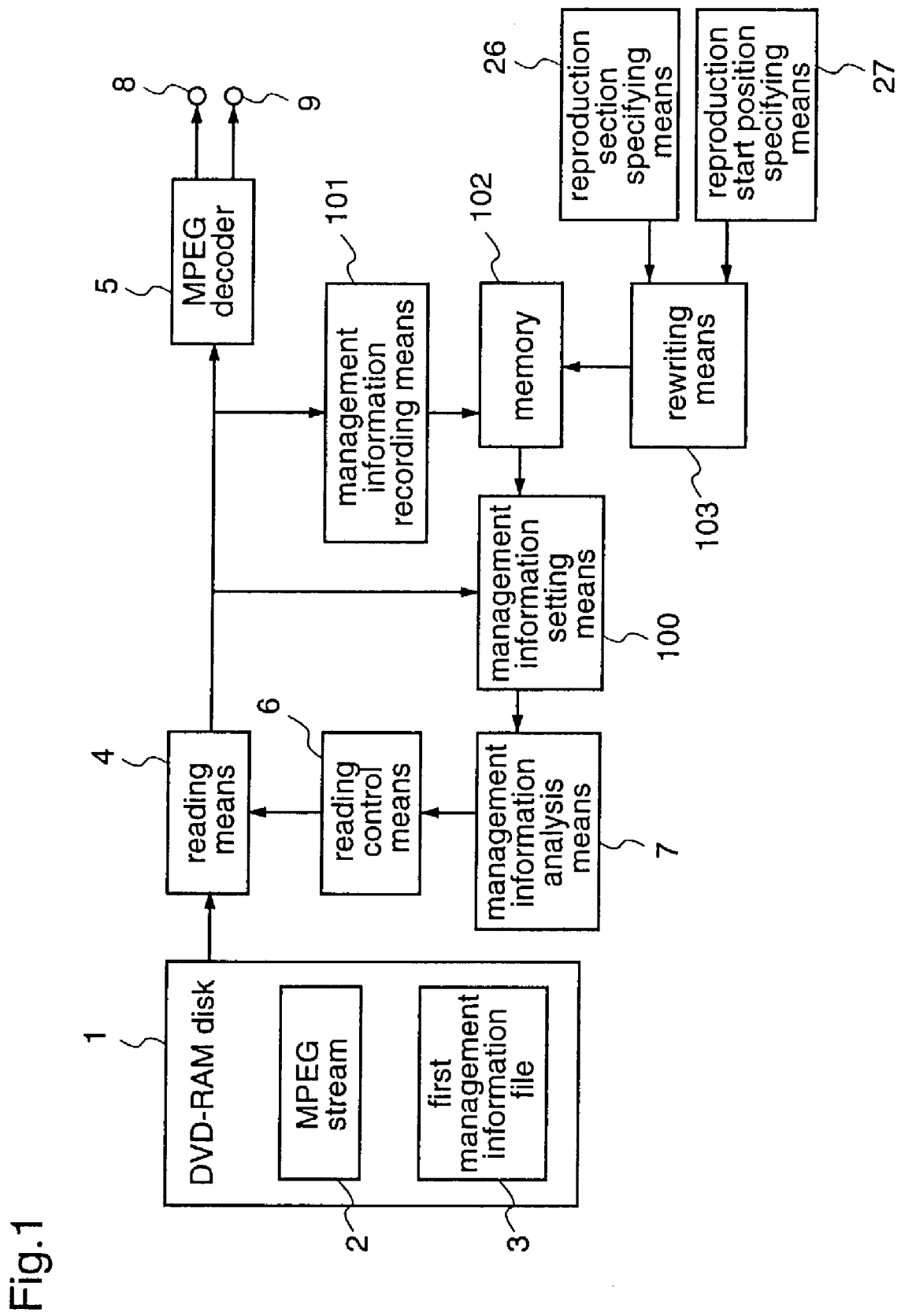
FIG. 1 is a diagram illustrating the construction of an information signal editing device according to a first embodiment of the present invention.
Figure 16:
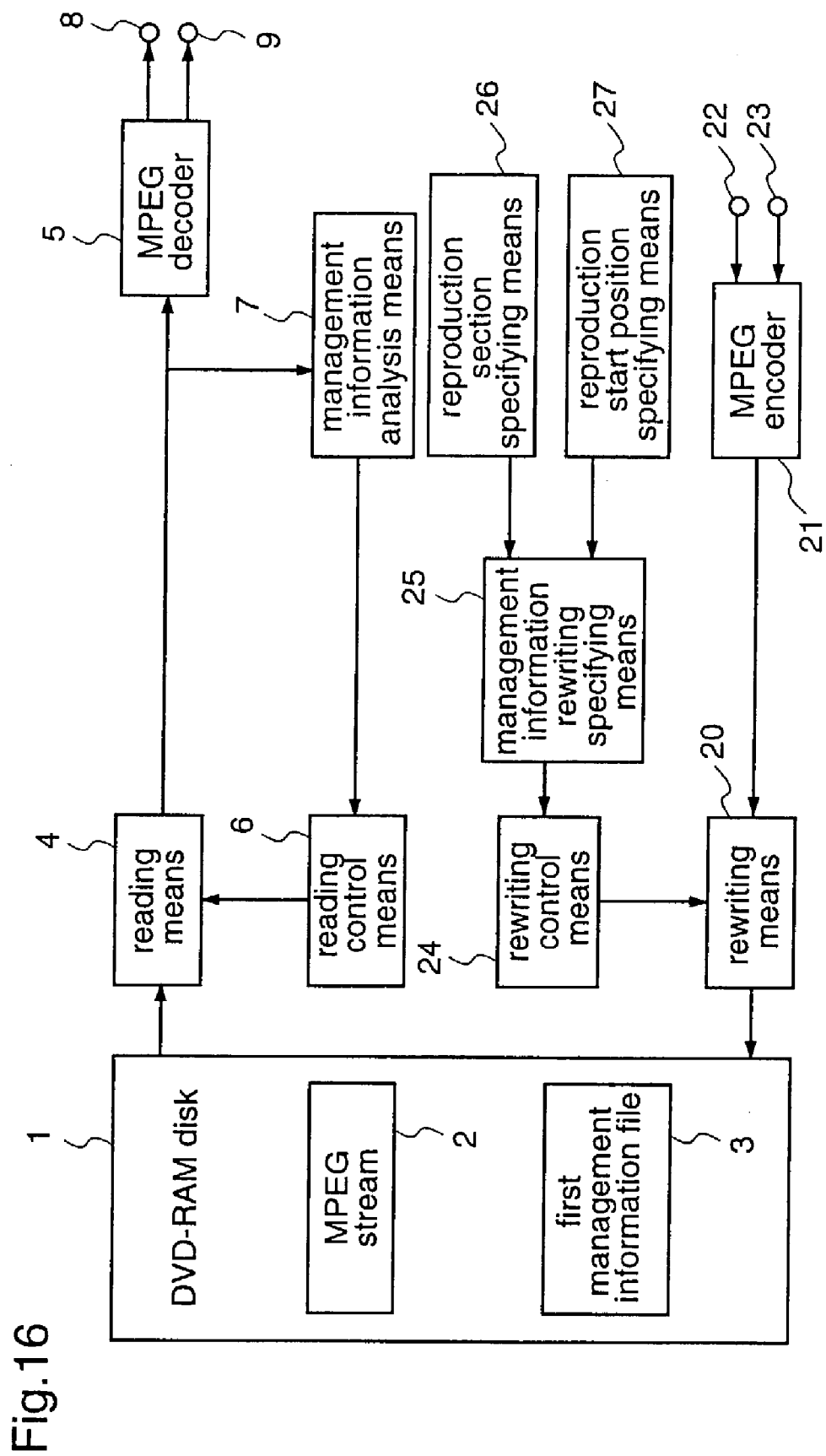
FIG. 16 is a diagram illustrating the construction of a conventional video recording/reproduction device.

FIG. 1 is a diagram illustrating the construction of the information signal editing device according to the first embodiment. In the drawing, the same or corresponding constituent elements as those shown in FIG. 16 are denoted by the same reference numerals, and descriptions thereof will be omitted.

In FIG. 1, numeral 102 denotes a storage part (hereinafter, referred to as a "memory"), and numeral 101 denotes a management information recording means for recording a first management information file 3 recorded on a DVD-RAM disk 1, among an output of a reading means 4, into the memory 102. Numeral 103 denotes a rewriting means for rewriting the management information file recorded in the memory 102 into a second management information file which specifies a desired reproduction start position or a desired reproduction section (hereinafter, both of them generically referred to as a "reproduction operation"). Numeral 100 denotes a management information setting means for setting a reproduction operation for a desired MPEG stream (hereinafter, referred to as a "second MPEG stream") among the MPEG stream 2, on the basis of the second management information file rewritten by the rewriting means 103.

The memory 102 may be anything but a non-writable DVD-RAM disk 1. For example, when data is reproduced via a personal computer, the memory 102 may be a hard disk, and when another drive having a recording function is provided, a medium on which data can be recorded by the drive, or a removable memory card or the like may be employed.

Figure 2:
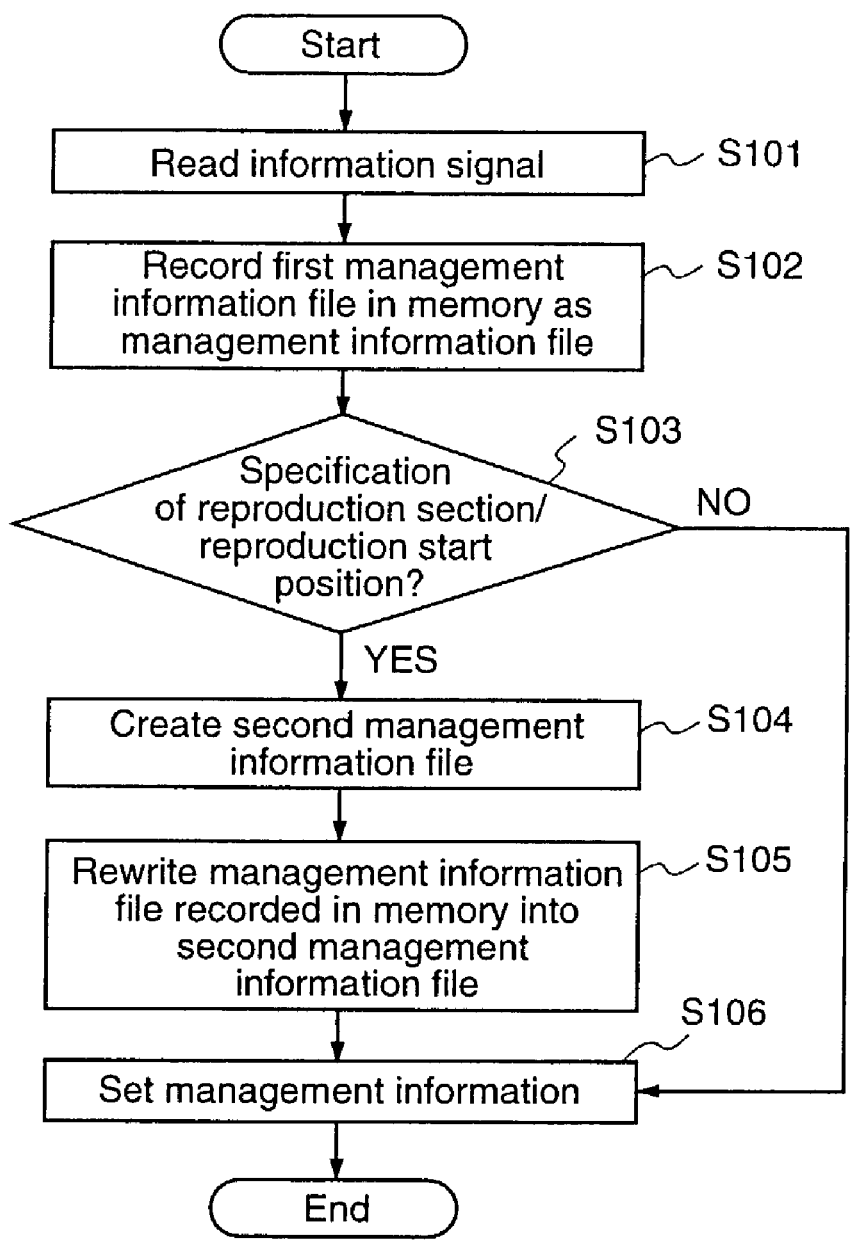
FIG. 2 is a flowchart illustrating an information signal editing method according to the first embodiment of the invention.

An operation of the information signal editing device constructed as described above will be described with reference to FIG. 2. While the DVD-RAM disk 1, which is a rewritable medium, is originally rewritable, here a description will be given of a device which performs a simple editing function when an information signal obtained from the DVD-RAM disk 1 cannot be rewritten, for example, when the DVD-RAM disk 1 is loaded on a ROM-type drive with no hardware for rewriting, such as a DVD-ROM drive having a DVD-RAM reproduction function, or when the DVD-RAM disk is under a write-protect function by a notch of a case or by means of a software.

Initially, the reading means 4 reads an information signal (step S101), and the management information recording means 101 records the first management information file 3, among the read information signal, into the memory 102 as a management information file (step S102).

Thereafter, the management information setting means 100 sets the first management information file recorded in the memory 102 as management information, and a reproduction operation is performed according to the management information (step S106). The management information file recorded in the memory 102 is not part of the first management information file 3 but the entire first management information file 3. At this time, while the MPEG stream 2 can be recorded, it is not necessarily required to record the MPEG stream since, no matter how great MPEG compression is carried out, as a recording time is increased, the size of a file becomes several G and, thus, a large amount of memory is required.

In this way, the information signal obtained from the DVD-RAM disk 1 can be read as usual, while protecting the MPEG stream 2 from being rewritten.

Next, a description will be given of a case where a user specifies a video to watch or a section to listen to through the reproduction section specifying means 26 or the reproduction start position specifying means 27 (step S103). It is desirable that specification of a reproduction operation is performed on the basis of a not-shown reproduction means (a display means for a video, an audio generation means for an audio). Here, a description will be given taking specification of a video reproduction start position as an example. A user specifies a desired position through the reproduction start position specifying means 27 while monitoring a video being reproduced, and a reproduced video at the specified part is obtained as small static data (hereinafter, referred to as "thumb nail data"), and the obtained data is managed by another management means. Even when plural reproduction start parts are specified later, the thumb nail data makes it easy to recognize them when simple editing is performed. The reproduction section specifying means 26 enables to specify a single range of video to be reproduced or plural ranges of video. It is possible to combine the reproduction section specifying means 26 and the reproduction start position specifying means 27, so that both of the reproduction section and the reproduction start position are specified.

By the specification through the reproduction section specifying means 26 and/or the reproduction start position specifying means 27, management information relating to a reproduction position of the MPEG stream 2 is newly generated (step S104).

The rewriting means 103 rewrites only the information part relating to the reproduction section and/or the reproduction start position, among the management information file recorded in the memory 102 (here, the first management information file), into the newly generated management information, and records the rewritten management information file into the memory 102 as a second management information file (step S105). While management information is added in the case of newly specifying a position, this case is also described as rewriting of the information here.

In this way, the first management information file 3 recorded on the non-rewritable DVD-RAM disk 1 is recorded in the memory 102, and the specification is performed through the reproduction section specifying means 26 and/or the reproduction start position specifying means 27, and the management information recorded in the memory 102 is updated into the second management information file which has content different from that of the first management information file 3.

The management information setting means 100 performs setting so that the MPEG stream 2 recorded on the DVD-RAM disk 1 is managed by the second management information file which is rewritten by the rewriting means 103 and is recorded in the memory 102, instead of the first management information file 3 (step S106). That is, the management information setting means 100 performs setting such that the first management information file 3 is rewritten into the second management information file so that the second management information file on the memory 102 becomes the management information for the MPEG stream 2, instead of the first management information file 3 on the DVD-RAM disk 1, and such that the MPEG stream 2 on the DVD-RAM disk 1 is employed.

The management information analysis means 7 analyzes the management information set by the management information setting means 100 (the second management information), and the reproduction operation is performed via the reading control means 6.

To be specific, a description will be given taking the reproduction start position as an example. The management information analysis means 7 obtains the management information relating to reproduction start from the management information setting means 100, and instructs the reading control means 6 to specify the obtained management information for a position from which reproduction is started. The reading control means 6 controls the reading means 4 according to the instruction from the management information analysis means 7 and specifies the reproduction start.

In this way, the management information setting means 100 performs setting so that the second MPEG stream which agrees with the reproduction operation is outputted from the reading means 4 by employing the MPEG stream 2 on the DVD-RAM disk 1 as heretofore, and the second MPEG stream is inputted to the MPEG decoder 5, whereby a user is able to reproduce the video/audio data from a desired start position.

The setting of the reproduction start position is performed by only rewriting the management information file recorded in the memory 102 into the second management information file, and the MPEG stream 2 is not modified, resulting in an extremely quick and simple operation. At this time, plural reproduction start positions are added to a single MPEG stream.

In the information signal editing device according to the first embodiment, the management information recording means 101 records only the first management information file into the memory 102, the rewriting means 103 rewrites the first management information file stored in the memory 102 into the second management information file according to the instruction from a user, and the first information file is set as the second information file on the basis of the second management information file. Therefore, even when the information signal on the DVD-RAM disk 1 cannot be rewritten, it is possible to virtually reproduce the information signal by specifying an arbitrary reproduction operation, whereby a user is able to instantly obtain a desired reproduction signal by making full use of a characteristic of the plate-shaped medium.

Embodiment 2

Hereinafter, an information signal editing device according to a second embodiment of the present invention will be described.

Figure 3:
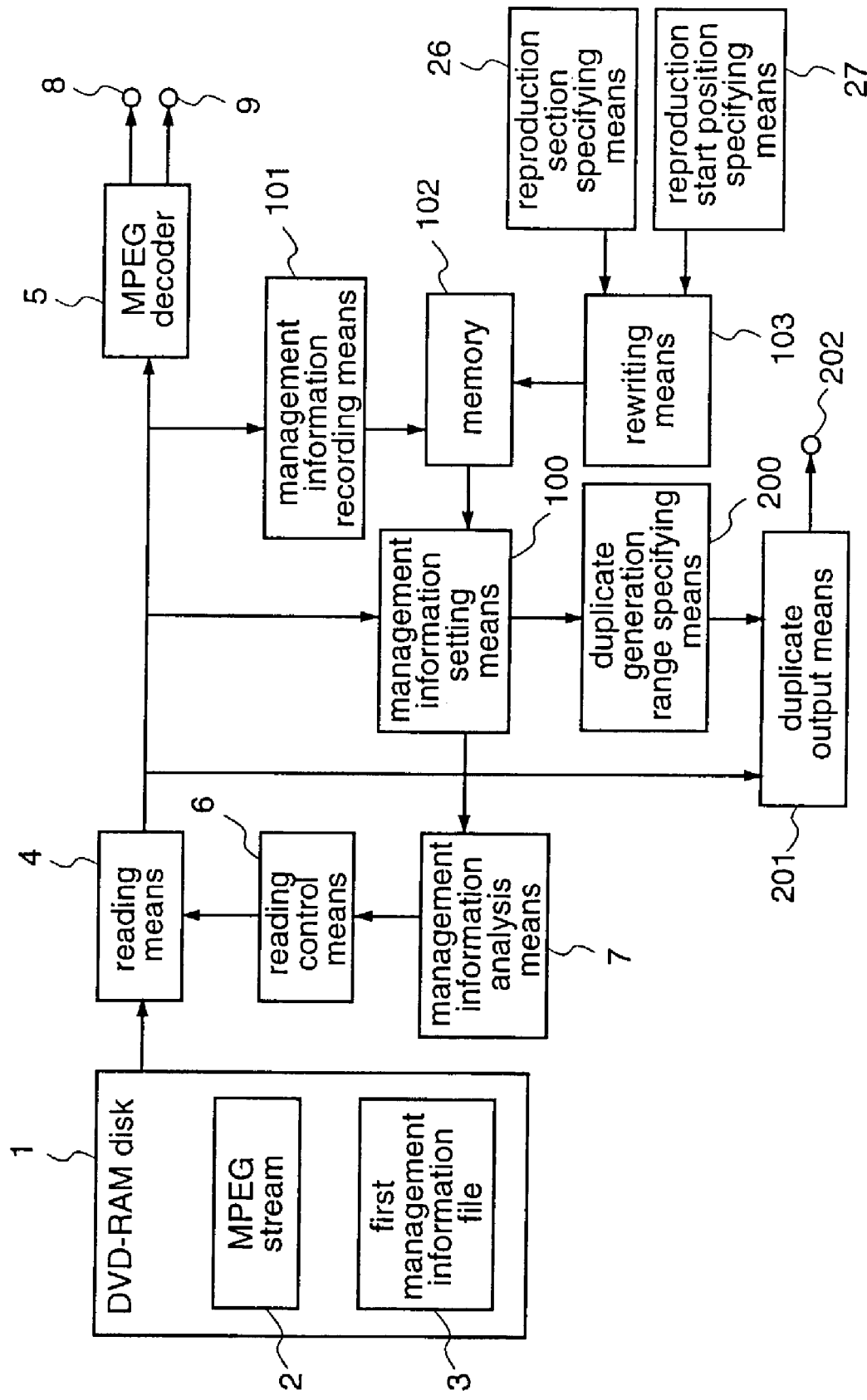
FIG. 3 is a diagram illustrating the construction of an information signal editing device according to a second embodiment of the present invention.

FIG. 3 is a diagram illustrating the construction of the information signal editing device according to the second embodiment. In the drawing, the same or corresponding constituent elements as those shown in FIG. 1 are denoted by the same reference numerals, and descriptions thereof will be omitted.

Numeral 200 denotes a duplicate generation range specifying means for specifying a range to duplicate from a second management information file set by a management information setting means 100. Numeral 201 denotes a duplicate output means for duplicating an information signal on a DVD-RAM disk 1, that is, data of an MPEG stream 2, and outputting it. Numeral 202 denotes a duplicate signal output terminal for outputting second MPEG stream information duplicated by the duplicate output means 201.

Figure 4:
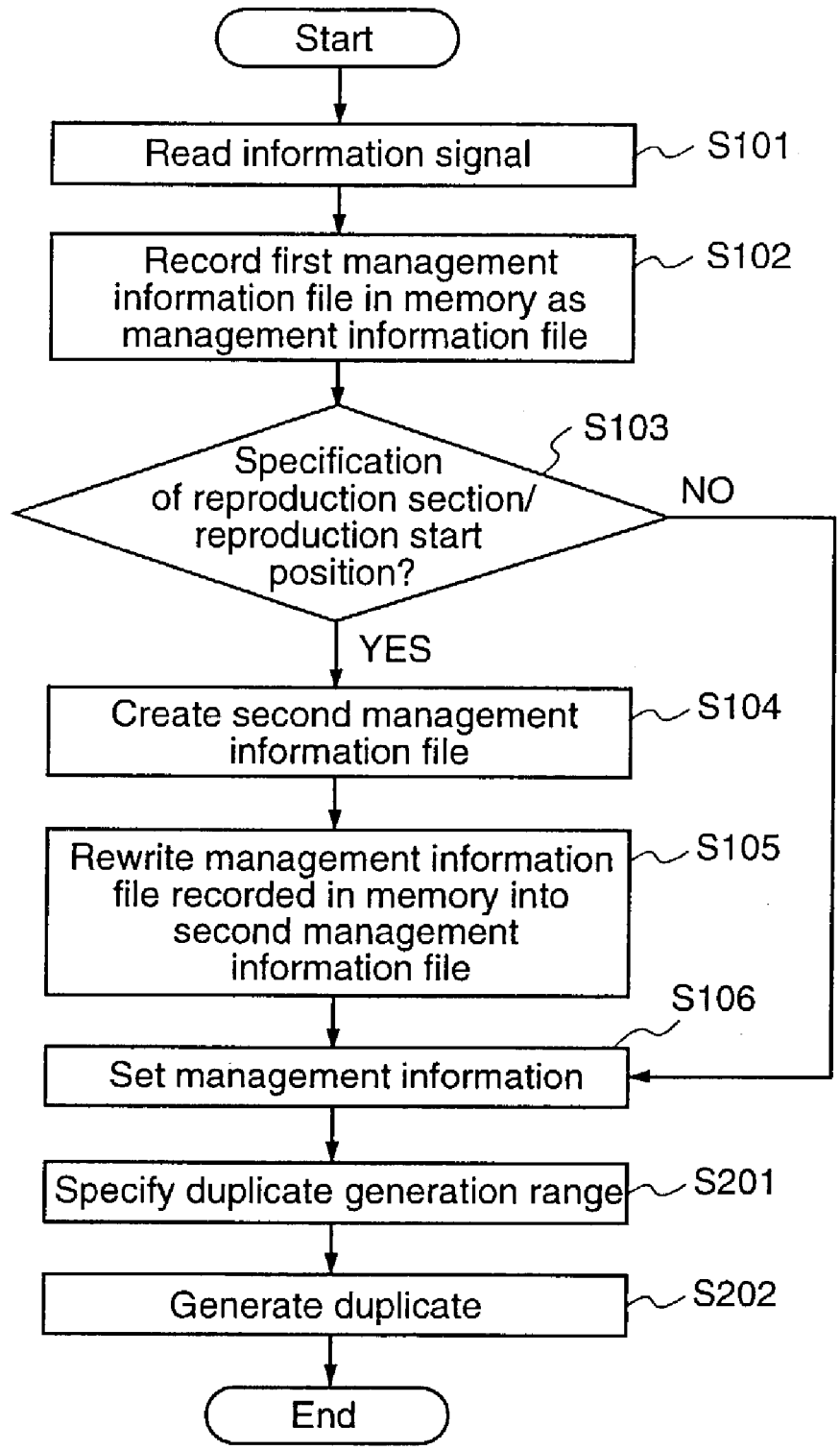
FIG. 4 is a flowchart illustrating an information signal editing method according to the second embodiment of the invention.

An operation of the information signal editing device constructed as described above will be described with reference to FIG. 4. Here, the operation will be described with respect to a difference from the first embodiment. The second management information file is also effective in generating a duplicate of an MPEG file corresponding to the second MPEG stream. While a description will be given here of signal duplicate of the second MPEG stream specified by a reproduction start position specifying means 27, the same applies to the case where a reproduction section is specified by a reproduction section specifying means 26.

Usually, when a duplicated file of the MPEG stream data 2 recorded on the DVD-RAM disk 1 is created, it is easy to create a duplicate of the whole data of the MPEG stream 2. However, when a duplicate file of the second MPEG stream which is part of the desired MPEG stream 2 that is specified by a user is created, another process is required. Specifically, when the MPEG stream 2 is delimited at a point specified as the reproduction start position, a duplicate can be generated by only specifying the reproduction start position to have the same as a specified range. However, when the first management information file 3 on the DVD-RAM disk 1 cannot be rewritten, it is impossible to specify an arbitrary reproduction start position.

Then, in this second embodiment, a duplicate file is outputted as follows. Initially, an information signal is read from the DVD-RAM disk 1, the MPEG stream 2 is reproduced, the reproduction start position is specified through the reproduction start position specifying means 27, the second management information file is created on the basis of information of the specified reproduction start position, and a management information file in a memory 102 is rewritten into the second management information file by a rewriting means 103.

The management information setting means 100 sets the second management information file which is newly rewritten by the rewriting means 103 into a management information analysis means 7, and a reproduction operation for the MPEG stream 2 on the DVD-RAM disk 1 is performed on the basis of the second management information file, whereby reproduction is performed from the desired reproduction start position.

Then, the duplicate generation range specifying means 200 specifies a range of video data to be duplicated on the basis of the reproduction start position information set in the second management information file (step S201). The range corresponds to the reproduction start position information. For example, when there exist three reproduction start positions in a single MPEG file, an initial start position A, a middle reproduction start position B, and a final reproduction start position C, it is possible to specify three sections, i.e., a range from A to B, a range from B to C, and a range from C to the last.

The duplicate output means 201 reads the MPEG stream 2 on the DVD-RAM disk 1 from the reading means 4 on the basis of the specification as described above, creates a duplicate file for each specified region of the MPEG stream 2 as an MPEG file, and outputs it from the duplicate signal output terminal 202 (step S202). At this time, an MPEG file which is divided into three pieces of data, the data in the range from A to B, the data in the range from B to C, and the data in the range from C to the last, is outputted. In other words, an arbitrary section of a single MPEG stream 2 can be extracted as an MPEG file on the basis of the second information file. It depends on user's selection whether to specify a part or a section.

Usually, the MPEG stream at the specified position is all outputted as a duplicate file according to the reproduction start position information. However, when there are plural pieces of reproduction start position information, a user selects a piece of arbitrary reproduction start position information from the plural pieces of reproduction start position information, and specifies it through the duplicate generation range specifying means 200, thereby creating a desired duplicate file.

Therefore, the MPEG file starting with a specified scene is created, and a dedicated DVD title and/or a video scene for presentation or the like can be created on the basis of the created file. Further, since the reproduction start position of the MPEG file outputted from the duplicate signal output terminal 202 is rewritten on the basis of the second management information file, an arbitrary reproduction start position can be easily specified even when the disk is in a non-rewritable state. For example, when the output signal from the duplicate signal output terminal 202 is recorded on another medium, the MPEG file having information of the arbitrary start position is recorded on this medium.

While there is a single second management information file, plural second files can exist independently by giving different file names to the created files or storing the files at different places. By adopting this construction, since the reproduction start position can be arbitrarily specified, plural reproduction patterns can be created for a single first information file, and the patterns can coexist as independent files, whereby a reproduction pattern of a specified favorable reproduction position can be selected anytime and freely.

Further, in case of a recordable disk such as the DVD-RAM disk, disk-specific information such as a volume label or a number unique to the disk can be created at initialization formatting, and thus the disk-specific information can be also utilized. To be specific, the reading means 4 reads the disk-specific information, and the management information recording means 101 obtains the read disk-specific information as well as associates the same with the second management information file. For example, in case of a number unique to the disk, there is applied a method such as adding the number at the end of the file name.

When a commutative disk is inserted, the management information setting means 100 sets the second management information file corresponding to the commutative disk into the management information analysis means 7, thereby processing an information file recorded on the commutative disk on the basis of the second management information file for each commutative disk. By adopting this construction, even when the commutative disk is exchanged, the second management information file corresponding to the commutative disk can be used independently, and a user is able to create a duplicate of a desired second information file by specifying various reproduction patterns as described in this second embodiment.

In the information signal editing device according to the second embodiment, the management information recording means 101 records only the first management information file into the memory 102, the rewriting means 103 rewrites the first management information file stored in the memory 102 into the second management information file according to the instruction from a user, the first information file is set as the second information file on the basis of the second management information file, and the second information file is outputted as a duplicate file. Therefore, even when the information signal on the DVD-RAM disk 1 cannot be rewritten, reproduction on the basis of the second management information file created according to the user's instruction can be virtually performed by employing a conventional recording/reproduction system, and a duplicate file in which part of the first information file in the information signal is duplicated can be created.

While in the first and second embodiments the information signal is recorded on the DVD-RAM disk, the present invention is applicable to not only the information signal on the DVD-RAM disk but also to a signal recorded on the so-called ROM medium such as a CD-ROM and a DVD-ROM, a signal recorded in a nonvolatile memory, a signal of a network or broadcasting which is obtained by wire or wireless, or the like. Further, while it is assumed that the rewritable medium on which the information signal is recorded is in a non-recordable state, in cases where the rewritable medium is in a recordable state, a free space in the rewritable medium can be adapted for a storage part when there is a space in the capacity of the rewritable medium on which the information signal is recorded. This is also applicable to a draw-type medium such as a CD-R and a DVD-R.

While in the first and second embodiments the description has been given taking the video data as an example, the present invention is not restricted to the video data, and the same effect is achieved when the information signal has a management information file, since the first management information file can be replaced as the second management information file. Further, while the information file is the MPEG stream, other formats are also available, and it is also possible to convert the MPEG stream into other file formats.

Embodiment 3

Hereinafter, an information signal editing device according to a third embodiment of the present invention will be described.

Figure 5:
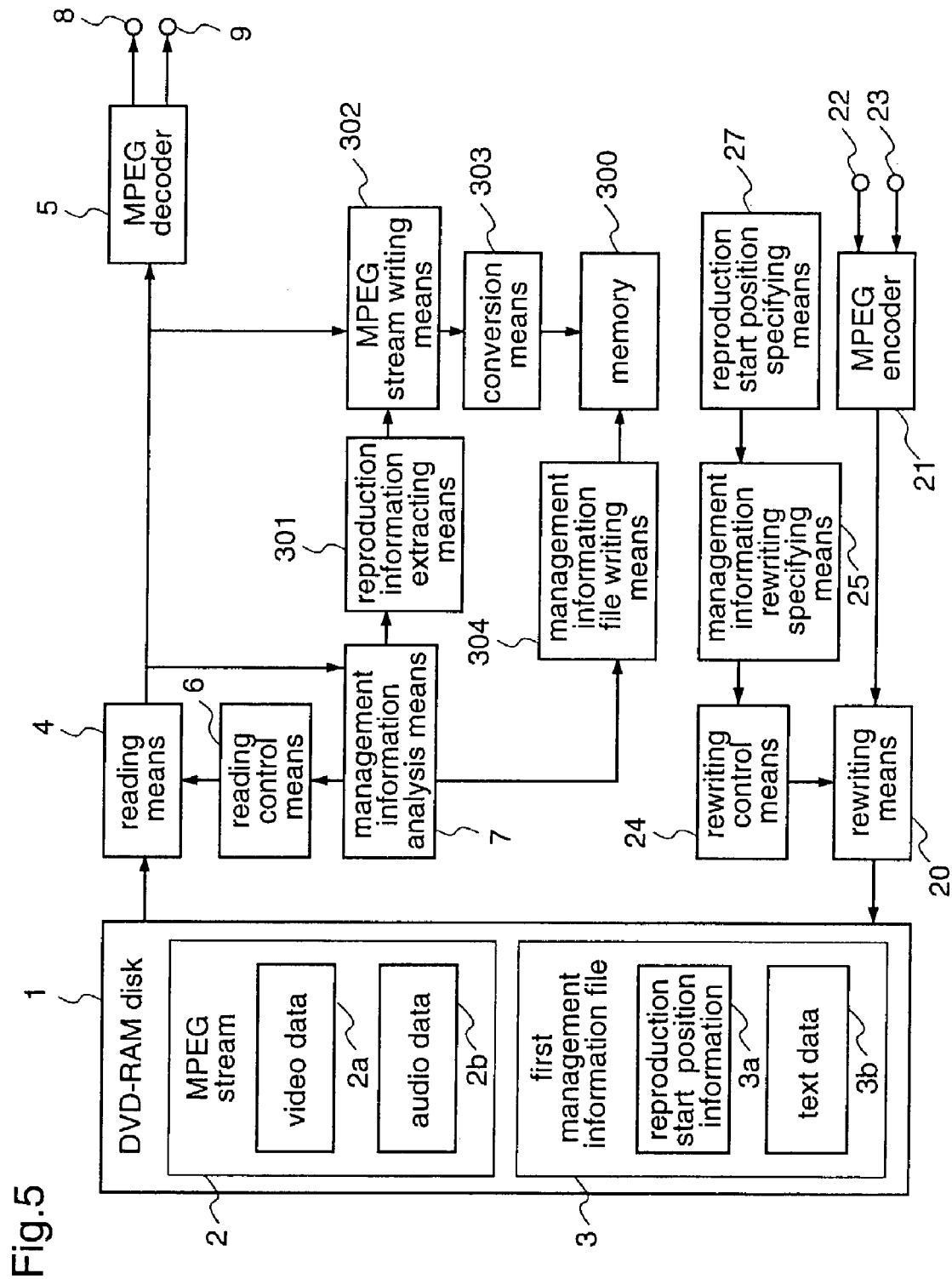
FIG. 5 is a diagram illustrating the construction of an information signal editing device according to a third embodiment of the present invention.

FIG. 5 is a diagram illustrating the construction of the information signal editing device according to the third embodiment. In the drawing, the same or corresponding constituent elements as those shown in FIGS. 1 and 16 are denoted by the same reference numerals, and descriptions thereof will be omitted.

In FIG. 5, numeral 301 denotes a reproduction information extracting means for extracting information relating to reproduction from the result of analysis by a management information analysis means 7 which analyzes a first management information file 3 on a DVD-RAM disk 1. Numeral 302 denotes an MPEG stream writing means for recording a desired MPEG stream (hereinafter, referred to as a "second MPEG stream") among an MPEG stream 2, into a memory 300 on the basis of the information extracted by the reproduction information extracting means 301. Numeral 303 denotes a conversion means for partially converting a characteristic of the MPEG stream 2 to be recorded in the memory 300, so as to make it into an appropriate information file. By partially converting the characteristic, a general-purpose MPEG stream is obtained. Numeral 304 denotes a management information file writing means for organizing information relating to the second MPEG stream stored in the memory 300, among the first management information file 3, making the organized information into a file, and writing it into the memory 300.

Figure 6:
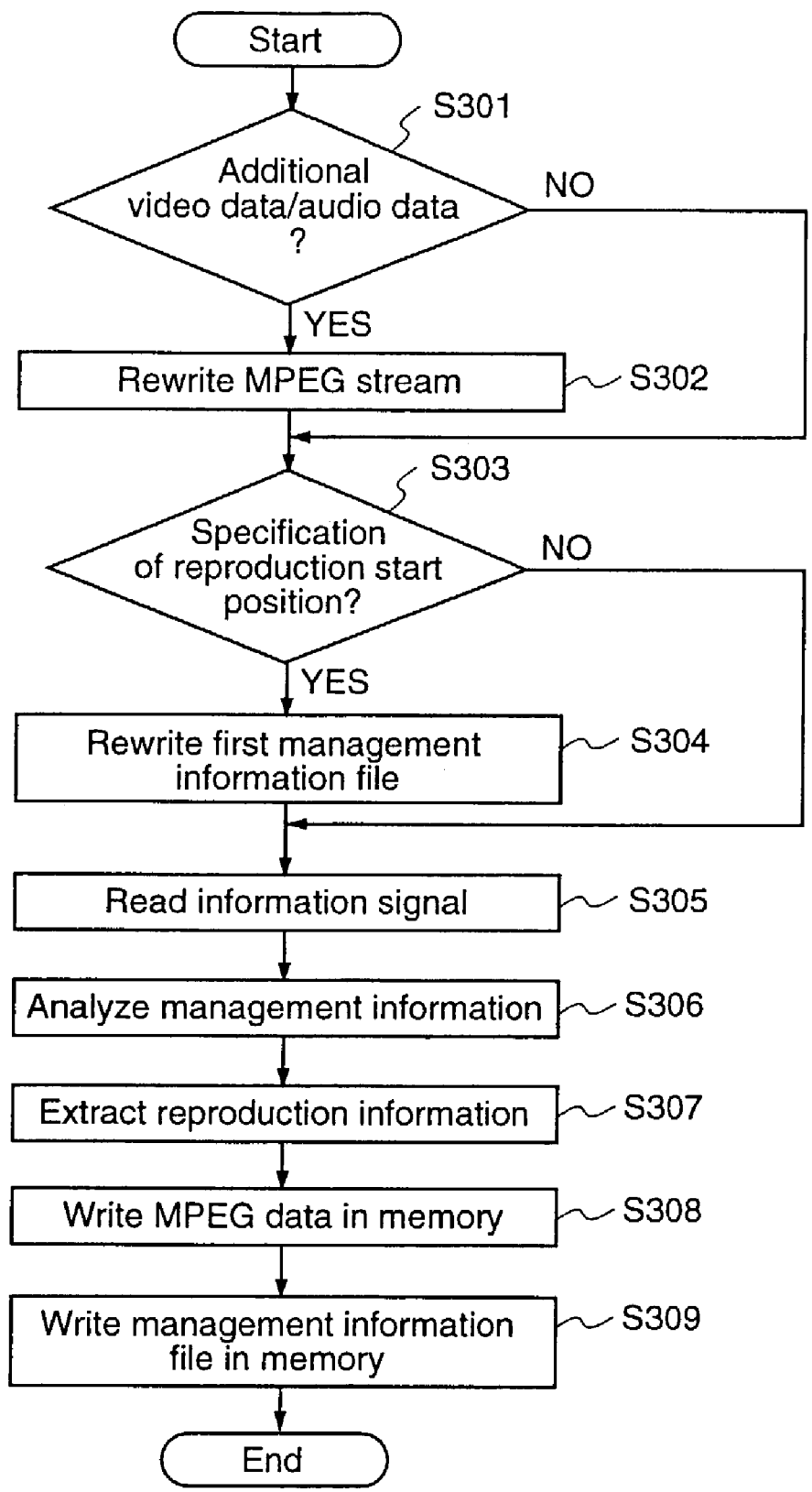
FIG. 6 is a flowchart illustrating an information signal editing method according to the third embodiment of the invention.

The information signal editing device constructed as described above will be described with reference to FIG. 6.

Initially, rewriting of an information signal on the DVD-RAM disk 1 will be described.

A video signal and an audio signal are digitalized and recorded on the DVD-RAM disk 1 as the MPEG stream 2. Here, it is assumed that main constituent elements of the MPEG stream 2 are video data 2a and audio data 2b. At this time, it is usual that the video data 21 has a large amount of information and, thus, the volume thereof is larger than that of the audio data 2b.

Information relating to the constitution of the MPEG stream 2 is recorded as the first management information file 3. The first management information file 3 is constituted by reproduction start position information 3a, text data 3b which is added to enable a user to recognize or manage each piece of recording data, and the like. Usually, the text data 3b is added when a name thereof is given for each section of a video which is recorded on the basis of the video recording standard, for each reproduction start position or the like, and every time the text data 3b is added, it is written in the first management information file 3 or the first management information file 3 is rewritten. The first information file 3 is recorded in the folder on the DVD-RAM disk 1 in which the MPEG stream 2 is recorded.

When the video data 2a and/or the audio data 2b are to be recorded (step S301), video data and/or audio data which are encoded by an MPEG encoder 21 are recorded on the DVD-RAM disk 1 by a writing means 20, and the first management information file is updated (step S302).

Even in the case of draw-recording, the newly created MPEG stream, which is a single file, is added to the MPEG stream 2 recorded on the DVD-RAM disk 1, and the first management information file 3 is newly registered for the added MPEG stream, whereby reproduction is smoothly performed. Since delimitation information is recorded in the first management information file 3 for each added MPEG stream, even when the MPEG stream is a single file, it can be distinguished in recording units when being reproduced, and on the reproduction side, an initial video is outputted as, for example, a reduced static image (hereinafter, referred to as a "thumb nail") on the basis of the section information for each unit of recorded MPEG stream, thereby providing facility to a user.

On the other hand, when only the first management information file 3 is to be rewritten without newly recording the video data 2a and the audio data 2b (step S303), the first management information file 3 is rewritten and the rewritten file is recorded on the DVD-RAM disk 1 (step S304). Thereby, simple editing is performed so that a desired MPEG stream 2 is reproduced.

The simple editing function will be described taking the reproduction start position as an example. A user specifies a desired reproduction start position through a reproduction start position specifying means 27 while monitoring a video, and the rewriting means 20 rewrites management information for managing the specified MPEG stream 2 via a management information rewriting specifying means 25 and a rewriting control means 24. Reproduction is performed from the desired reproduction start position of the MPEG stream 2 on the basis of the first management information file 3. That is, while for example the video data 2a is decoded and reproduced, a video signal at an arbitrary reproduction start position of the MPEG stream 2 stored on the DVD-RAM disk 1 is monitored, and the desired reproduction start position is specified by the reproduction start position specifying means 27. At this time, while the specification can be performed on the basis of audio information which is obtained by decoding the audio data 2b, video information which is obtained by decoding the video data 2a is more effective since it generally makes a clearer delimitation and, thus, it is easier to specify the position of the video data 2a as described above, and a video can be monitored as a thumb nail when being reproduced after the specification.

To be specific, when a user specifies a desired reproduction start position among the video data 2a through the reproduction start position specifying means 27, the management information rewriting specifying means 25 specifies a part where the management information is required to be rewritten, among the first management information file 3, and the rewriting means 20 performs rewriting according to control of the rewriting control means 24. At this time, the MPEG stream 2 remains recorded on the DVD-RAM disk 1, and only the first management information file 3 is rewritten.

As described above, for example, when the MPEG stream data 2 is added with data and recorded as a new MPEG stream, or when data are selectively reproduced from stream data including the MPEG stream 2 by the simple editing, the first management information file 3 is updated, and the information signal on the DVD-RAM disk 1 is reread by the reading means 4, whereby reproduction is started. As described for the prior art example, also in this case, reproduction is performed on the basis of the information described in the management information file obtained by updating the first management information file on the DVD-RAM disk 1.

Next, a reproduction operation and simple editing after the updating of the first management information file 3 will be described.

Initially, the information signal (the MPEG stream 2 and the first management information file 3) is read from the DVD-RAM disk 1 (step S305).

The MPEG stream 2 in/to which the reproduction start position is specified or is added, or the first management information file 3 which is updated to manage the delimitation of the newly set MPEG stream is read by the reading means 4, and the MPEG stream 2 is inputted to the MPEG stream writing means 302, while the first management information file 3 is inputted to the management information analysis means 7 (step S306).

Then, the reproduction information extracting means 301 extracts reproduction information from the first management information file (step S307). The reproduction information corresponds to the above-described reproduction start position information in the simple editing, which specifies the reproduction start position, and the reproduction start position information is outputted to the MPEG stream writing means 302.

The MPEG stream writing means 302 writes the MPEG stream 2 on the DVD-RAM disk 1 or an MPEG stream which is obtained by newly adding a desired MPEG stream to the MPEG stream 2, into the memory 300, as the second MPEG stream for which a desired range or size is specified by a user, on the basis of the reproduction information extracted by the reproduction information extracting means 301 (step S308). That is, the head and end of the file data to be stored by the MPEG stream writing means 302 are decided on the basis of the reproduction start position information. For example, when there exist three points A, B, and C from the head, as the reproduction start information, in a single MPEG stream, three MPEG streams, one from the point A to B, one from the point B to C, and one from the point C to the last, are read by the reading means 4, and are recorded in the memory 300, whereby the three MPEG streams are created in the memory 300. Here, the construction in which the MPEG stream is inputted to the conversion means 303 before being recorded in the memory 300 is illustrated. This construction is given in view of a case, for example, where part of the MPEG stream 2 is required to be modified, in which case the conversion means 303 converts part of the read MPEG stream 2 or adds packet information to the MPEG stream 2, so as to partially modify the constitution of the MPEG stream, and outputs the modified MPEG stream 2 to the memory 300. However, in particular cases where the structure of the reproduction-target second MPEG stream as an ultimate goal is based on, for example, the video recording standard, or the like, no modification may be introduced.

While the description has been given taking the reproduction start position information as an example here, the section information for draw-recorded data, which is included in the first management information file 3 recorded on the DVD-RAM disk 1, is also available. In this case, plural second information files with different sections of draw-recording are stored in the memory 300.

The management information file writing means 304 selects information relating to the second MPEG stream which is recorded in the memory 300 by the MPEG stream writing means 302, from the first management information file 3 on the DVD-RAM disk 1, and writes the selected information in the memory 300 as a second management information file (step S309). The second management information file is recorded as a file in a single specific format, and the information recorded in the second management information file, which is information specified by a user or the like, corresponds to the second MPEG stream stored in the memory 300. For example, text data indicating a name given to the reproduction start position information, video data obtained by compressing data at the reproduction start position, or the like, is stored in the memory 300. It is also possible that a desired file name is added to the text data indicating a name given to the reproduction start position information, by a user, or a different name is automatically added thereto by using information of a date or a time. Thus, the text data can be automatically managed even when no name is supplied.

The management information file writing means 304 outputs the second management information file to the memory 300 is stored as a single file. It is desirable that the file format at this time is a format referred to as an "HTML". A file in HTML format has versatility and, thus, can be used anywhere. In addition, the HTML-format file enables to associate a recorded character with the second MPEG stream, thereby adding a function as a menu of the second MPEG stream.

For example, it is possible to associate the text data indicating a name given to the reproduction start position information or the like, which is described in the second management information file to be outputted to the memory 300 by the management information file writing means 304, with the second MPEG stream corresponding to the text data which is stored in the memory 300, or to associate the video data which is obtained by compressing data at the reproduction start position with the stored second MPEG file corresponding to the video data. This setting can be realized by only giving a description in text format when the second management information file is stored in the memory. To be specific, when plural MPEG files are stored in the memory, plural file names and actual MPEG files can be associated with the second management information file. In this case, reproduction of a desired MPEG file can be specified by only opening the stored second management information file and specifying the described MPEG file name or clicking the same on a dedicated browser. As described above, even when plural MPEG files are stored at a time, reproduction can be easily performed with a single second management information file.

When this system is constructed in a storage part as the memory 300, such as a hard disk which can be controlled by a personal computer, the associated second MPEG file is reproduced by means of, for example, a decoder attached to the personal computer, only by opening the file outputted from the management information file writing means 304 with a dedicated browser and selecting the text data.

While the file outputted from the management information file writing means 304 is in HTML format, it is also possible to simply record text data related to the stored second MPEG stream among the text data 3*b* recorded on the DVD-RAM disk 1, in text format. In this case, while versatility is slightly reduced, the same advantage is obtained in the respect that the outputted second MPEG stream can be instantly managed.

In the information signal editing device according to the third embodiment, the management information on the reproduction start position of the first information file of the information signal or the like is stored in the memory 300 as the second management information file, so that plural information files can be independently stored on the memory 300 as the second information files on the basis of the information of the reproduction start position in the second management information file, and the second management information file can be associated with the second information file and stored therewith in the same place, whereby a reproduction operation for the second information file or a desired information file selected from the second information file can be managed on the basis of each second management information file.

Embodiment 4

Hereinafter, an information signal editing device according to a fourth embodiment of the present invention will be described. The difference from the third embodiment is the existence of a video data section specifying means 400. In the third embodiment, for example, as in the case of simple editing, it is assumed that a first management information file 3 on a DVD-RAM disk 1 is rewritten by a rewriting means 20, and a second MPEG stream is stored in a memory 300 on the basis of the rewritten first management information file 3. In other words, when the second MPEG stream is to be stored in the memory 300, the first management information file on the DVD-RAM disk 1 has to be rewritten. In this fourth embodiment, a description will be given of a device which is able to store the second MPEG stream in which an arbitrary section is specified, in the memory 300, without rewriting the first management information file on the DVD-RAM disk 1, in addition to performing the editing method in the third embodiment.

Figure 7:
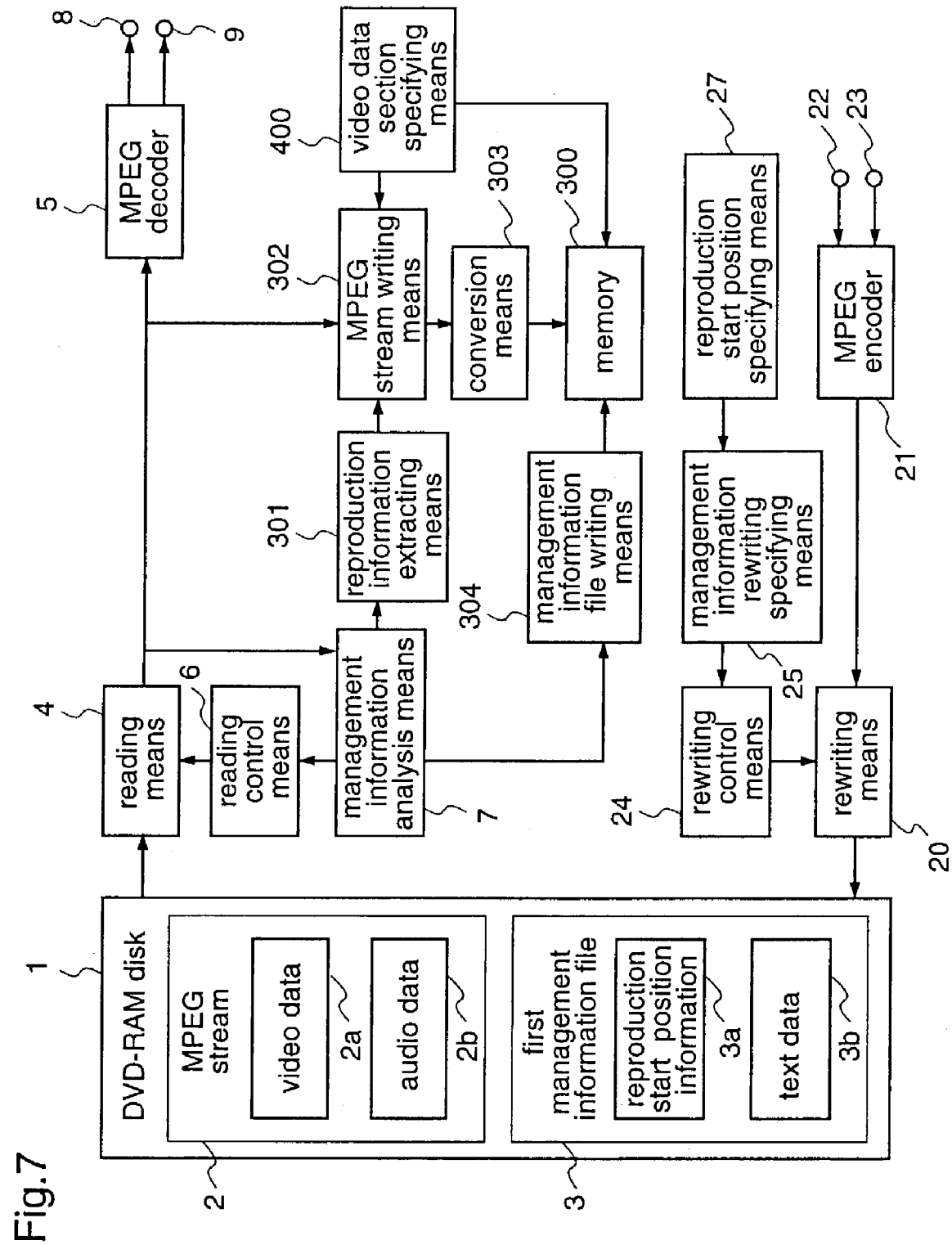
FIG. 7 is a diagram illustrating the construction of an information signal editing device according to a fourth embodiment of the present invention.

FIG. 7 is a diagram illustrating the construction of the information signal editing device according to the fourth embodiment. In the drawing, the same or corresponding constituent elements as those shown in FIG. 5 are denoted by the same reference numerals, and descriptions thereof will be omitted.

Numeral 400 denotes a video data section specifying means for specifying a video data section.

Figure 8:
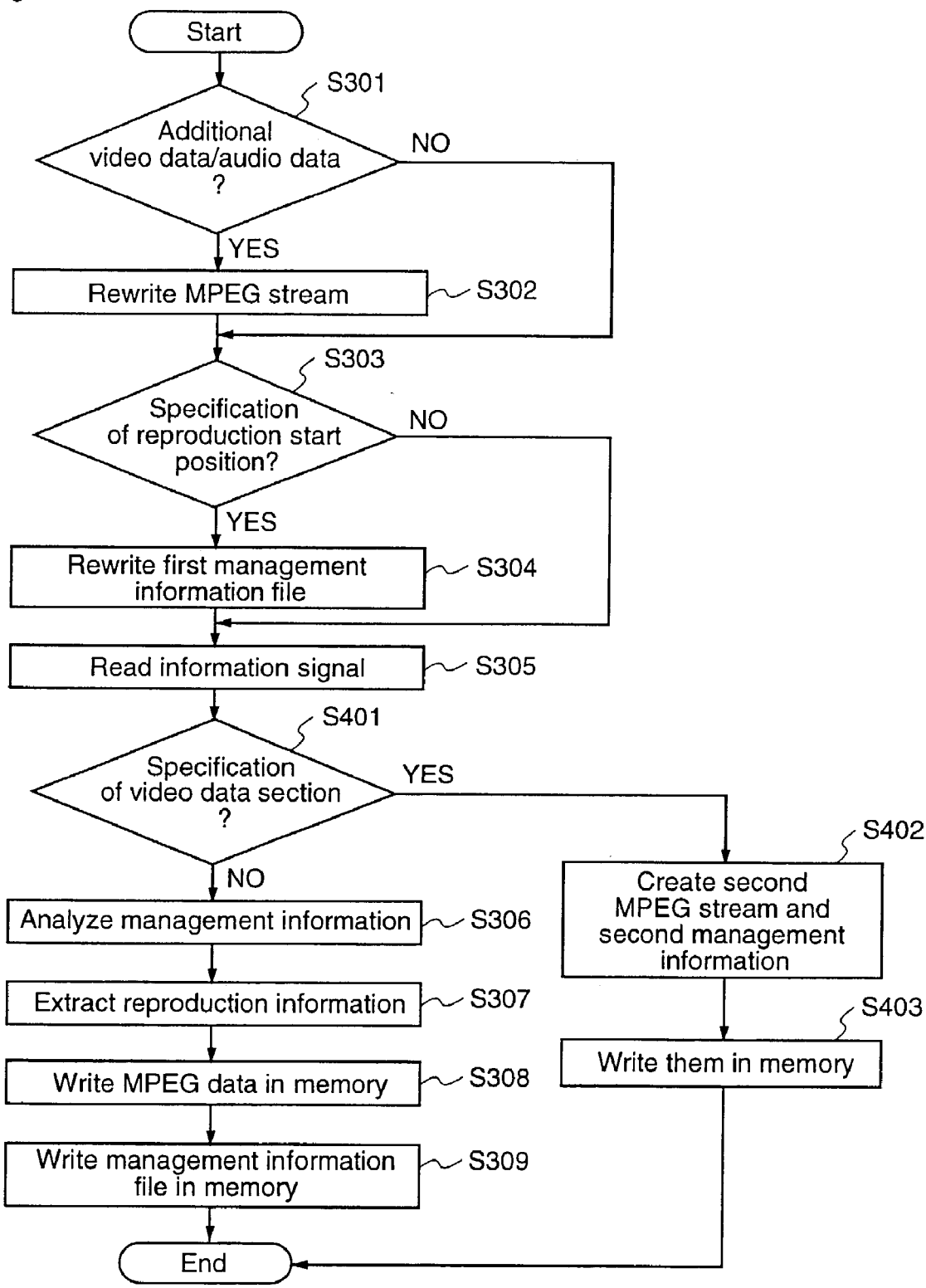
FIG. 8 is a flowchart illustrating an information signal editing method according to the fourth embodiment of the invention.

An operation of the information signal editing device constructed as described above will be described with reference to FIG. 8.

Initially, the video data section specifying means 400 specifies the head of the MPEG stream from a part of the MPEG stream 2 which is being reproduced, when a user monitors video data 2*a* with, for example, a display means (not shown) and specifies a desired video position, as well as specifies the end of the corresponding MPEG stream when the user monitors the video data 2*a* and specifies desired video data (step S401).

When a section between the head and the end is specified by these two operations, a desired MPEG stream is decided, and the MPEG stream is created as a second MPEG stream and management information for the second MPEG stream is created as a second management information file (step S402), and they are recorded in the memory 300 as a file in a single format (step S403). The specified section between the head and the end is not restricted to one, but plural sections can be similarly specified.

Thereby, a desired MPEG stream among the MPEG stream 2 can be instantly stored in the memory 300 as a second MPEG stream without rewriting the first management information file on the DVD-RAM disk 1, and a desired file is created.

In the information signal editing device according to the fourth embodiment, the second information file which is created from the first information file by setting an arbitrary section is stored in the memory 300 without rewriting the first management information file 3 for managing the first information file (MPEG stream 2), among the information signal on the DVD-RAM disk 1, whereby an MPEG file can be created from the second information file even when the disk is in a non-rewritable state.

Embodiment 5

Hereinafter, an information signal editing device according to a fifth embodiment of the present invention will be described.

Figure 9:
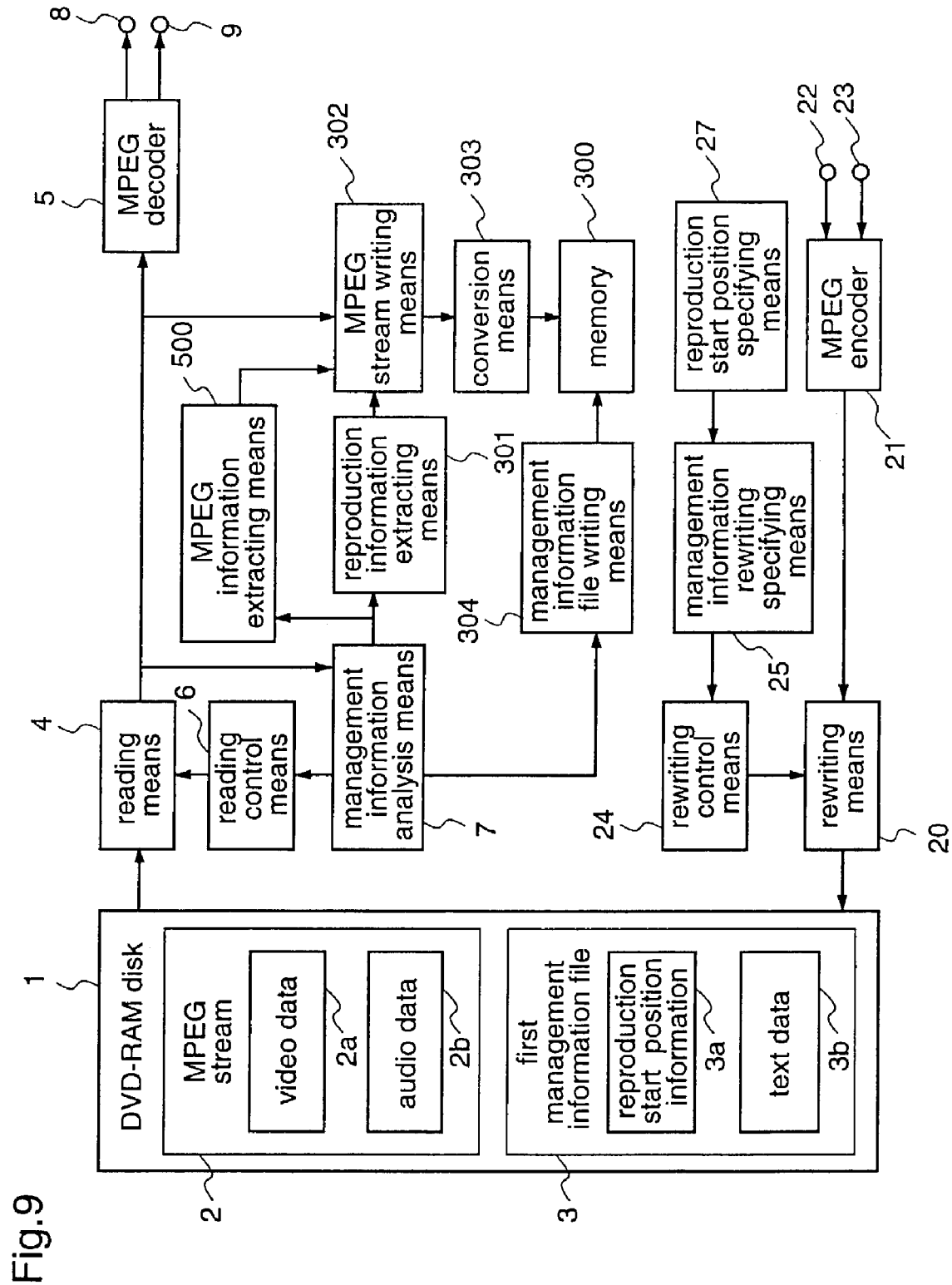
FIG. 9 is a diagram illustrating the construction of an information signal editing device according to a fifth embodiment of the present invention.

FIG. 9 is a diagram illustrating the construction of the information signal editing device according to the fifth embodiment. In the drawing, the same or corresponding constituent elements as those shown in FIG. 5 are denoted by the same reference numerals, and descriptions thereof will be omitted.

Numeral 500 denotes an MPEG information extracting means for extracting information relating to an MPEG stream 2 from a first management information file recorded on a DVD-RAM disk 1.

Figure 10:
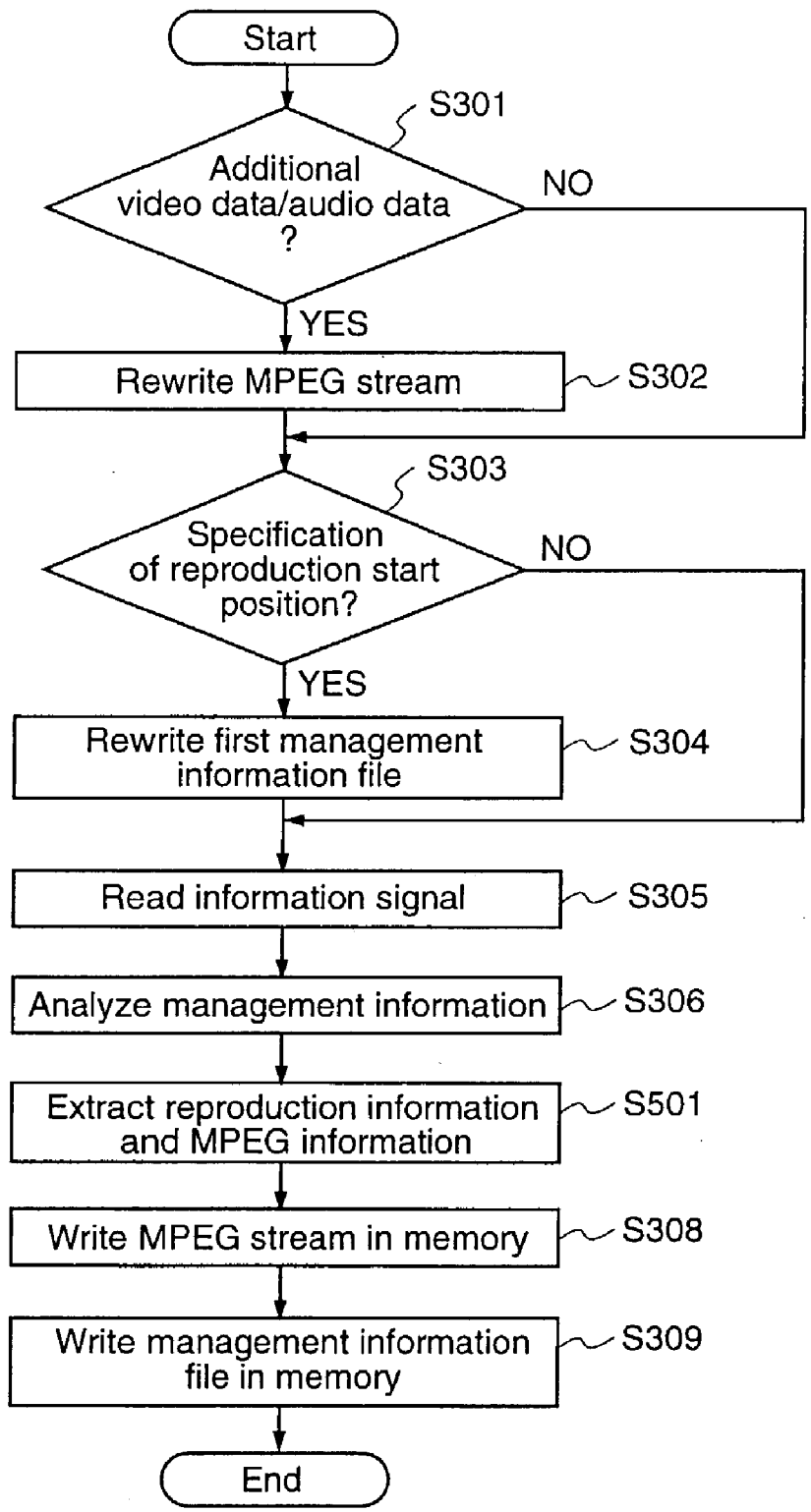
FIG. 10 is a flowchart illustrating an information signal editing method according to the fifth embodiment of the invention.

An operation of the information signal editing device constructed as described above will be described with reference to FIG. 10. The difference from the third embodiment is that the MPEG information extracting means 50 is added, and other constituent elements are identical to those in the third embodiment, and thus a description will be given hereinafter mainly of the MPEG information extracting means 500.

As information relating to the MPEG stream, there is information relating to the resolution. In the video recording standard, plural resolutions may exist for a single MPEG stream, and thus there are cases where plural pieces of information relating to the resolutions are recorded.

There is a case where when a desired MPEG file is stored in a memory 300 as a second MPEG file, the MPEG file is to be delimited according to a single resolution. At this time, it is far more efficient to check on the resolution information which is previously managed as a second management information file at recording, than to check on the information relating to a desired resolution, one by one, from the first management information file for managing the MPEG stream 2 outputted from the reading means 4.

Thus, the MPEG information extracting means 500 extracts the resolution information of a desired MPEG stream from the first management information file 3, and outputs it to an MPEG stream writing means 302 at the change of the resolution, and the MPEG stream writing means 302 delimits the MPEG stream (step S306, step S501). Therefore, even the second MPEG stream which is stored in the memory 300 on the basis of reproduction start position information can be separated as a different file when the resolution is different, whereby the second MPEG stream meeting user's demand and the second management information file for managing the MPEG stream can be provided. While MPEG streams with different resolutions are separated as different files according to the MPEG information here, it is also possible that the MPEG stream writing means 302 is added with a function of resolution conversion, so that the plural MPEG streams with different resolutions are arranged as a single file with the identical resolution. That is, the MPEG information extracting means 500 extracts the resolution information included in the MPEG information, and outputs it to the MPEG stream writing means 302 at the change of the resolution, and the MPEG stream writing means 302 performs resolution conversion to unify the resolution, thereby compositing the MPEG streams as a single file. For example, when a stream A with the resolution of 704×480-pixel is mixed with a stream B with the resolution of 352×480-pixel, the MPEG stream writing means 302 subjects the stream B with the 352×480-pixel resolution to resolution conversion such as an interpolation process, so that a stream with the resolution of 704×480-pixel is obtained, whereby the stream A and the stream B with different resolutions are arranged as a single stream with the resolution of 704×480-pixel.

The MPEG information extracting means 500 can also obtain copyright protection information or encryption information for the MPEG stream 2. The MPEG information extracting means 500 recognizes that duplication of the MPEG stream 2 is prohibited, on the basis of the extracted copyright protection information or the encryption information, and sends the prohibition information to the MPEG stream writing means 302, thereby preventing the MPEG stream 2 whose duplication is prohibited from being stored in the memory 300.

In the information signal editing device according to the fifth embodiment, the MPEG information which is information relating to the MPEG stream 2 on the DVD-RAM disk 1 is extracted, and the MPEG stream 2 is separated according to, for example, the resolution and written in the memory 300, thereby realizing reproduction of a desired MPEG file which is easy for a user to monitor, or ensuring security for the information signal whose duplication is prohibited. Therefore, an information signal editing device which saves user's trouble and has an excellent information management ability can be realized.

While in the third to fifth embodiments the storage part for storing the second information file and the second management information file is a memory, any type of storage part is applicable to the present invention as long as it enables reusing of the data of the recorded second MPEG stream. For example, in a case where a hard disk which is exclusively used for a personal computer, a nonvolatile memory, or a recording means having a recording function of a recordable medium is provided, when the recordable medium or a medium on which the information signal is stored is a recordable medium as described in the embodiments, the second information file and the second management information file can be stored on the medium as a different file as long as there is a free space in the medium.

Further, while in the third to fifth embodiments the information signal is recorded on the DVD-RAM disk, the present invention is applicable to any signal resource, and in addition to the information signal on the DVD-RAM disk, a signal recorded on the so-called ROM medium such as a CD-ROM and a DVD-ROM, a signal recorded in a nonvolatile memory, a signal of a network or broadcasting which is obtained by wire or wireless, and the like are also available.

Furthermore, while in the third to fifth embodiments the information file is the MPEG stream, the present invention is not restricted to the MPEG compression, and is applicable to formats other than the MPEG stream. That is, the information file managed by the management information file is applicable to the present invention.

Embodiment 6

Hereinafter, an information signal editing device according to a sixth embodiment of the present invention will be described. The difference from the third embodiment is that a multiplexing processing means 600 is provided instead of the conversion means 303 of the information signal editing device of the third embodiment. The information signal editing device according to the third embodiment has a problem that a video signal and an audio signal of an MPEG file stored in a memory 300 are not synchronized with each other at the head depending on an MPEG stream recorded on a disk. That is, when a part other than the head of the MPEG stream on the disk is extracted and stored in the memory as another file, the audio signal thereof may have information before being extracted and, thus, time axis information of the video signal and the audio signal do not necessarily coincide with each other from the head. Accordingly, deviation is generated when the extracted portion is reproduced or reused.

Figure 15A:
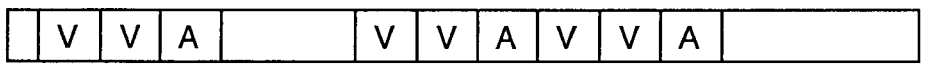
FIG. 15(a) shows the constitution of an MPEG stream.
Figure 15B:
FIG. 15(b) shows the constitution of video data.

A description will be given of the deviation with reference to FIGS. 15. FIGS. 15 are diagrams showing an example of the constitution of the MPEG stream which is extracted from the MPEG stream 2 recorded on a DVD-RAM disk 1 as described above, and is stored in the memory 300.

For example, as shown in FIG. 15(*a*), the MPEG stream stored in the memory 300 in the above-described system has a configuration in which mainly a video packet (V) and an audio packet (A) are inserted from the head as needed. This is a usual stream constitution. However, when the video signal and the audio signal are separated from the MPEG stream and are newly arranged according to the time axis information of each of the data, the video data and the audio data have the constitutions as shown in FIGS. 15(*b*) and 15(*c*), respectively.

Here, with respect to the audio signal shown in FIG. 15(*c*), there exists an audio signal corresponding to the video signal before being extracted, in a hatched portion extending to the point P. This is because it is not necessarily required that the MPEG stream 2 have synchronous video data 2*a* and audio data 2*b* as constituent units, and thus the extra audio as described above exits in the file which is separated at an arbitrary position and stored in the memory 300 as described above.

When this file is reproduced by a decoder or reused by another MPEG device as it is, an MPEG stream in which an audio is deviated from the video signal is obtained due to the extra audio data.

As a method for avoiding this, there is a method in which both of the video data 2*a* and the audio data 2*b* of the MPEG stream are decompressed once, so that non-compressed video and audio signals are obtained, and the demodulated video signal and audio signal are subjected to MPEG compression again. However, this method has a drawback that quite a long time is required to decompress and compress the video signal, a picture quality is reduced through the process of the compression/decompression, and the like.

In order to solve the above-described problems, a description will be given of an information signal editing device which is able to create an MPEG stream in which the audio data is synchronized with the video data, in a short time, without reducing a picture quality, with reference to FIG. 11. In the drawing, the same or corresponding constituent elements as those shown in FIG. 5 are denoted by the same reference numerals, and descriptions thereof will be omitted.

Figure 11:
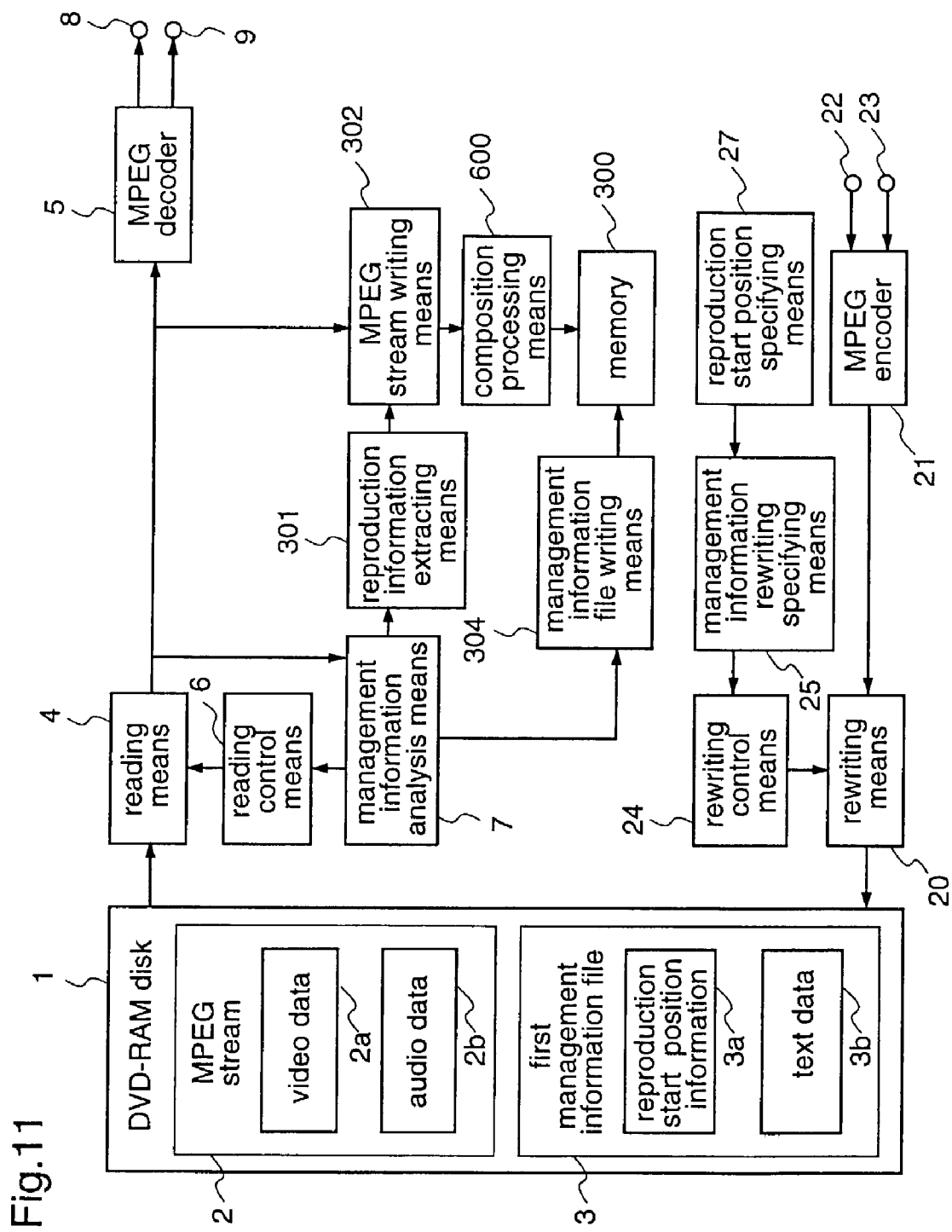
FIG. 11 is a diagram illustrating the construction of an information signal editing device which is provided with a multiplexing processing means, according to a sixth embodiment of the present invention.
Figure 12:
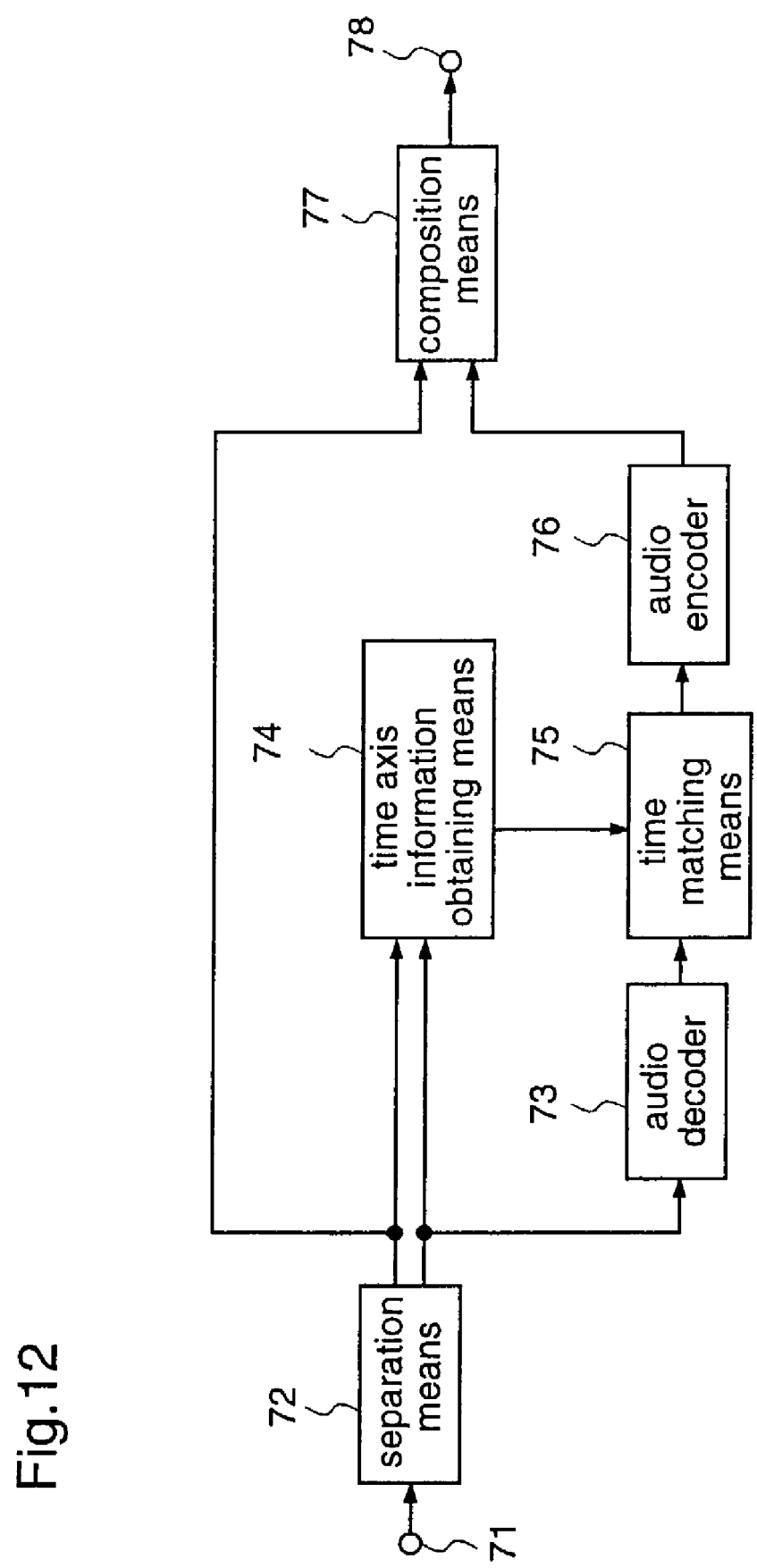
FIG. 12 is a diagram illustrating the construction of the multiplexing processing means.

In FIG. 11, numeral 600 denotes a multiplexing processing means having the construction as shown in FIG. 12. The multiplexing processing means 600 comprises an MPEG stream input terminal 71 for receiving an MPEG stream from the outside (here, an MPEG stream writing means 302), a separation means 72 for separating video data and audio data from the inputted MPEG stream, an audio decoder 73 for decompressing the audio data separated by the separation means 72 into an original audio signal, a time axis information obtaining means 74 for obtaining time axis information of each of the data separated by the separation means 72, a time matching means 75 for performing time matching by deleting or adding part of the audio data decoded by the audio decoder 73, an audio encoder 76 for compressing the output data from the time matching means 75, a multiplexing means 77 for multiplexing the video data separated by the separation means 72 with the audio data compressed by the audio encoder 76, to create an MPEG stream, and an MPEG stream output terminal 78 for outputting the MPEG stream.

Figure 13:
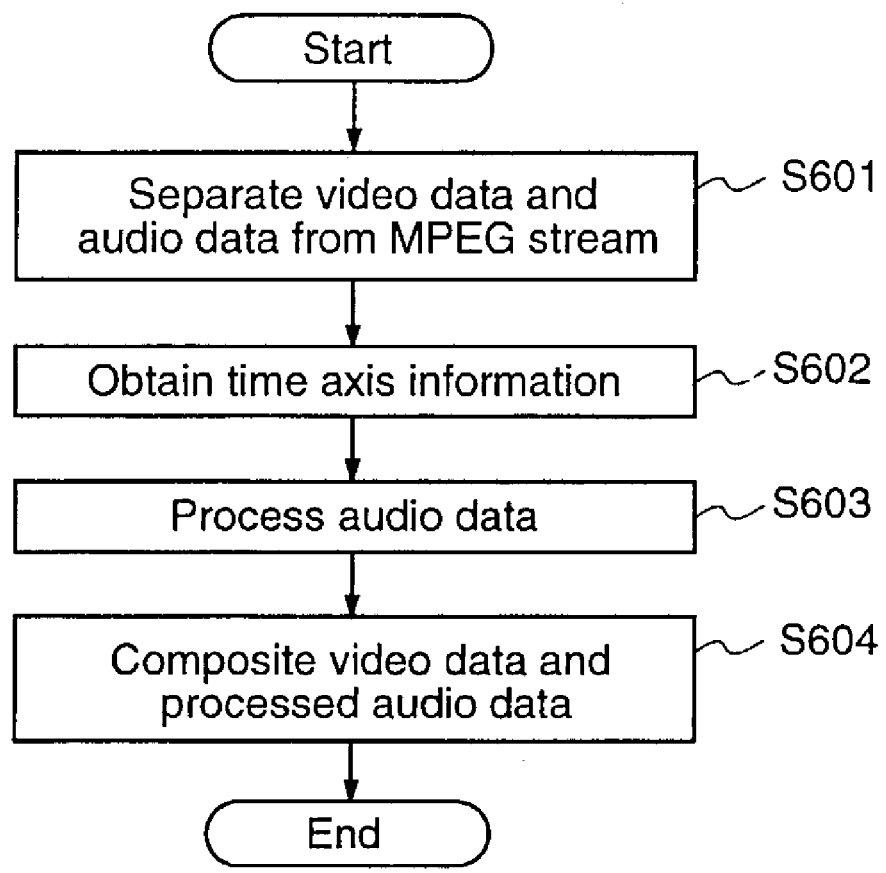
FIG. 13 is a flowchart illustrating a multiplexing processing method.

An operation of the information signal editing device constructed as described above will be described. Here, an operation of the multiplexing processing means 600 will be described in detail with reference to FIGS. 12 and 13. While here a description will be given of a case where the multiplexing processing means is provided in the information editing device, the present invention is also available in a case where, for example, the MPEG stream recorded on a CD-ROM or the like is reproduced by a personal computer.

Initially, video data and audio data are separated from an MPEG stream inputted through the input terminal 71, by the separation means 72 (step S601).

The separated video data, which is compressed, is inputted to the multiplexing means 77. Here, while the video data is data compressed in MPEG2 format, other compression formats are also available.

Figure 15C:
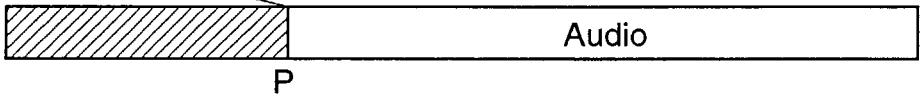
FIG. 15(c) shows the constitution of audio data.

The time axis information is obtained from the separated data by the time axis information obtaining means 74 (step S602). As time axis information obtained here, time axis information of the MPEG-compressed video data, which is referred to as "PTS (Presentation Time Stamp)" is convenient, and audio data corresponding to the time thereof usually exists. In addition to the time axis information of the video data, time axis information of the audio data is also obtained. Further, the time axis information of the video data to be obtained may refer only to a time axis for the head. When the MPEG stream is separated in units of minimum constituent of the MPEG, such as GOP, the time axis information is easy to obtain. In this way, the time axis information obtaining means 74 calculates a time difference between the video data and the audio data, such as a time axis difference P as shown in FIG. 15(c).

On the other hand, the audio data separated by the separation means 72 is inputted to the audio decoding means 73 to be decoded into original audio data once, and the decoded audio data is inputted to the time matching means 75 (here, it is assumed that the audio signal is compressed by an AC-3 method). Then, the time matching means 75 receives the information of the time axis difference between the video data and the audio data of the inputted MPEG file, which is obtained by the time axis information obtaining means 24. When, for example, the audio data has audio data corresponding to an MPEG stream immediately preceding the MPEG stream of the corresponding video data as shown in FIG. 15(c), the time matching means 75 is notified of the time axis difference up to the difference point P, and erases part of the decoded audio or prevents the same from being outputted on the basis of the notified time axis difference, thereby performing time matching so that the audio signal as shown in FIG. 15(c) is obtained (step S603).

Here, by the decoding process here, the audio can be processed without recognizing the unit of the video signal (GOP), and the audio data which is to be reproduced on the basis of the management information file may remain as it is when only the head part of the audio which is constituted as described above is deleted, resulting in a simple construction of the audio process.

Next, the output data from the time matching means 75 is inputted to the audio encoding means 76 to be a compressed audio signal again. A method of compression here may be different in format from one employed for the original audio signal. For example, when the compression method for the original audio data is the AC-3, audio compression in an MPEG method may be performed. This enables conversion into a highly multi-purpose MPEG file.

The audio data compressed by the audio encoding means 76, from which an unnecessary part is already deleted, is data which is synchronized with the separated video data at the head part thereof. Since the video data is only separated and is not subjected to any conversion, little time is required for that process, and it is obvious that a remarkably shorter process time is required as compared with a case where the video data is decoded and encoded again.

Then, the multiplexing means 77 multiplexes the audio data outputted from the audio encoder 76 and the video data separated by the separation means 72, and outputs the multiplexed data as an MPEG stream again (step S604). Thereby, the MPEG stream in which the video signal is synchronized with the audio signal is created, and the created MPEG stream is outputted from the output terminal 78, and is stored in the memory 300 in the format of a file, whereby the MPEG stream is extracted as an MPEG file with the synchronous video signal and audio signal. When this operation is performed on the basis of each result of extracting the reproduction information, plural MPEG files with specified sections can be extracted from a single MPEG file of the video recording standard.

Figure 14A:
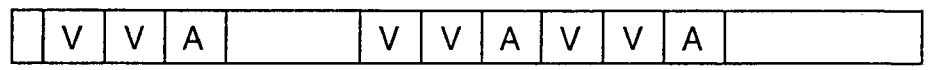
FIG. 14(a) shows the constitution of an MPEG stream.
Figure 14B:
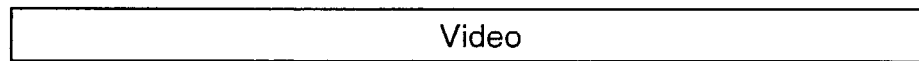
FIG. 14(b) shows the constitution of video data.
Figure 14C:
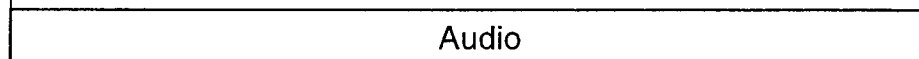
FIG. 14(c) shows the constitution of audio data.

The multiplexing means 77, which is generally referred to as a multiplexer, combines the video data with the audio data according to a prescribed rule to multiplex those data into an MPEG file. The multiplexed signal is illustrated in FIG.s 14; FIG. 14(a) shows the MPEG stream, FIG. 14(b) shows the video data, and FIG. 14(c) shows the audio data. As compared with FIG.s 15, the audio data shown in FIG. 14(c) is synchronized with the video data in the time axis, and no extra audio data is included.

While the time matching means 75 deletes part of the data, it may add data. To be specific, addition is performed when the time axis difference is reversed with respect to that in the above description. Further, in the above description, when the head of the audio data is deleted, the audio data finally comes short by the deleted amount, and thus the time matching means 75 may add data for the deleted amount at the end part of the file to be created. It is favorable that the audio data to be added is 0data (voiceless), and the amount of audio data to be added is required to be small as compared with the total amount.

In the information signal editing device according to the sixth embodiment, the reproduction start position or the like is specified on the basis of the management information recorded on the DVD-RAM disk 1, and plural MPEG files in which the video data are synchronized with the audio data from the head are stored on the basis of the information of the specified reproduction start position or the like, whereby the video data can be used without being converted, resulting in a short process time for the whole device. Further, owing to the short process time, the file storage can be performed in concurrence with the multiplexing process. Furthermore, when the audio encoding means 76 adopts a compression method different from one employed for the original audio, the format of the audio signal is converted, resulting in an increased versatility, sound quality, and the like.

While here the multiplexing processing means 600 is provided instead of the conversion means 303 in the third embodiment, the same effect can be achieved when the multiplexing processing means 600 is provided in the information signal editing device according to the fourth and fifth embodiments.

While the information signal editing device according to each of the first to sixth embodiments is realized by hardware, the device may be realized by software.

What is claimed is:

1. An information signal editing device for editing an information signal that includes a first information file consisted of plural signals with different size of capacities, which signals are independent and relevant from/to each other, and a first management information file for managing the first information file, the information signal editing device comprising:

a recording means for recording either the first information file or the first management information file into a memory; and a management information file storage means for storing a second management information file for managing either the first information file included in the information signal or the first information file recorded in the memory by the recording means, into the memory according to a predetermined instruction, wherein the first information file and the second information file recorded in the memory are MPEG stream data constituted by audio data and video data, and the editing device includes:

a separation means for separating the audio packet data and the video packet data from the MPEG stream data;

a time information obtaining means for obtaining PTS information which is time information from the output data from the separation means, and calculating time difference between the video packet data and the audio packet data from the PTS information;

an audio decoding means for decoding the audio packet data separated by the separation means;

a time matching means for performing time matching by deleting part of the output data from the audio decoding means on the basis of the time difference calculated by the time information obtaining means;

an audio encoding means for compressing the output data from the time matching means in a prescribed format to generate audio packet data; and a multiplexing means for multiplexing the video packet data separated by the separation means and the audio packet data generated by the audio encoding means;

wherein the recording means records the output from the multiplexing means into the memory.

2. An information signal editing method comprising:

recording either a first information file consisted of plural signals with different size of capacities, which signals are independent and relevant from/to each other, or first management information file for managing the first information file, into a memory; and storing a second management information file for managing either the first information file or the first management information file recorded in the memory, into the memory according to a predetermined instruction, and wherein the first information file and the second information file recorded in the memory are MPEG stream data constituted by video data and audio data, and the editing method comprises:

separating the audio packet data and the video packet data from the MPEG stream data, and obtaining PTS information which is time information from the separated audio packet data and video packet data;

calculating time difference between audio packet data and video packet data from the PTS information;

decoding the separated audio packet data, performing time matching by deleting part of the decoded audio data on the basis of the calculated time difference, and encoding the time-matched audio data to generate audio packet data; and multiplexing the separated video packet data and the encoded audio packet data.

* * * * *